United States Patent [19]

Maehara et al.

[11] Patent Number: 5,541,829
[45] Date of Patent: Jul. 30, 1996

[54] POWER SOURCE DEVICE

[75] Inventors: Minorua Maehara; Hiroshi Nishimura; Katsumi Sato; Toshiya Kanja; Tadahiro Kono, all of Kaboma, Japan

[73] Assignee: Matsushita Electric Works, Ltd., Osaka, Japan

[21] Appl. No.: 425,643

[22] Filed: Apr. 20, 1995

[30] Foreign Application Priority Data

Nov. 25, 1994 [JP] Japan .................................. 6-291719
Nov. 25, 1994 [JP] Japan .................................. 6-291721

[51] Int. Cl.⁶ ............................ H02J 3/00; H02M 5/45
[52] U.S. Cl. ..................................... 363/34; 363/37
[58] Field of Search ............................ 363/34, 36, 37, 363/39, 40, 97, 98, 131, 132

[56] References Cited

U.S. PATENT DOCUMENTS

| 4,647,837 | 3/1987 | Stemmler | 323/207 |
| 4,933,831 | 6/1990 | Takahashi et al. | 363/132 |
| 5,274,540 | 12/1993 | Maehara | 363/37 |
| 5,410,466 | 4/1995 | Haehara | 363/98 |

Primary Examiner—Matthew V. Nguyen

[57] ABSTRACT

An electric power source device is provided with a current compensating circuit capable of feeding to switching elements included in an inverter circuit currents substantially mutually anti-phase, the current compensating circuit thus reducing the currents flowing to the switching elements and allowing the switching elements of a small current rating to be utilizable.

9 Claims, 26 Drawing Sheets

FIG. 1
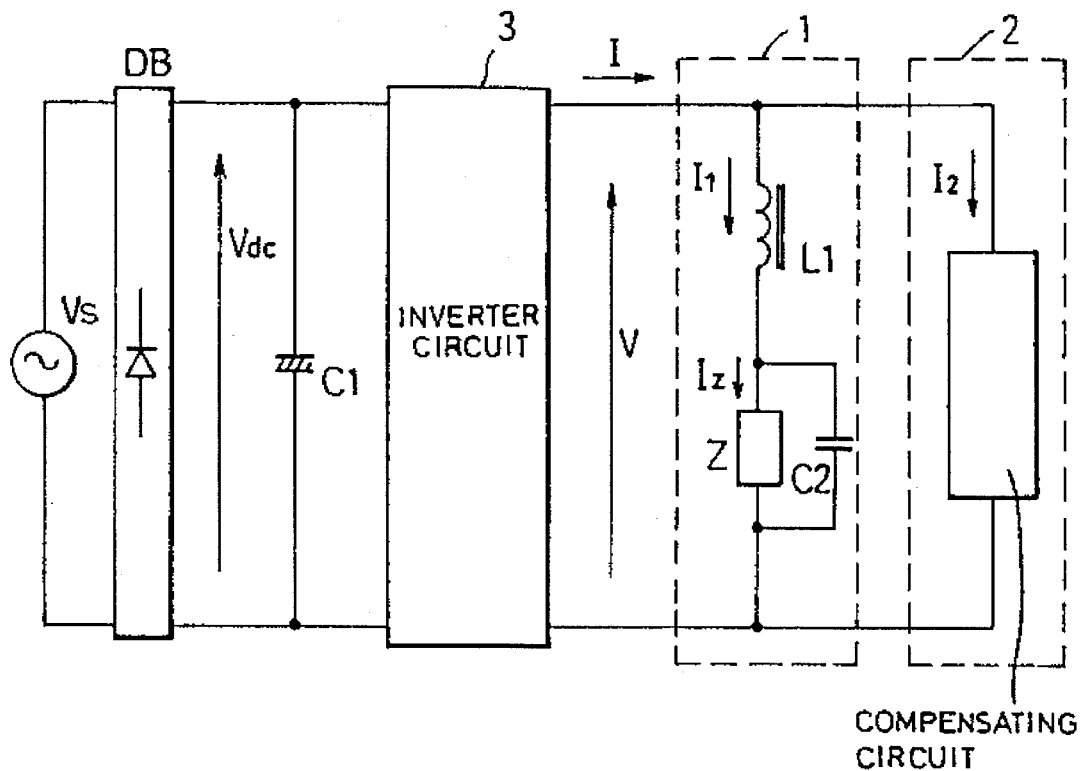
FIG. 2(a) V 
FIG. 2(b) $I_z$ 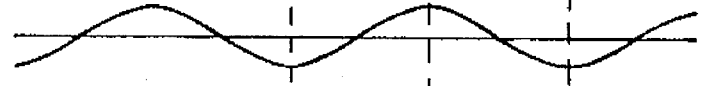
FIG. 2(c) $I_1$ 
FIG. 2(d) $I_2$ 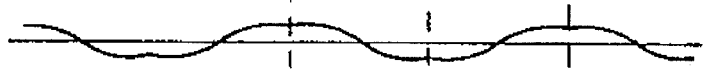
FIG. 2(e) I 

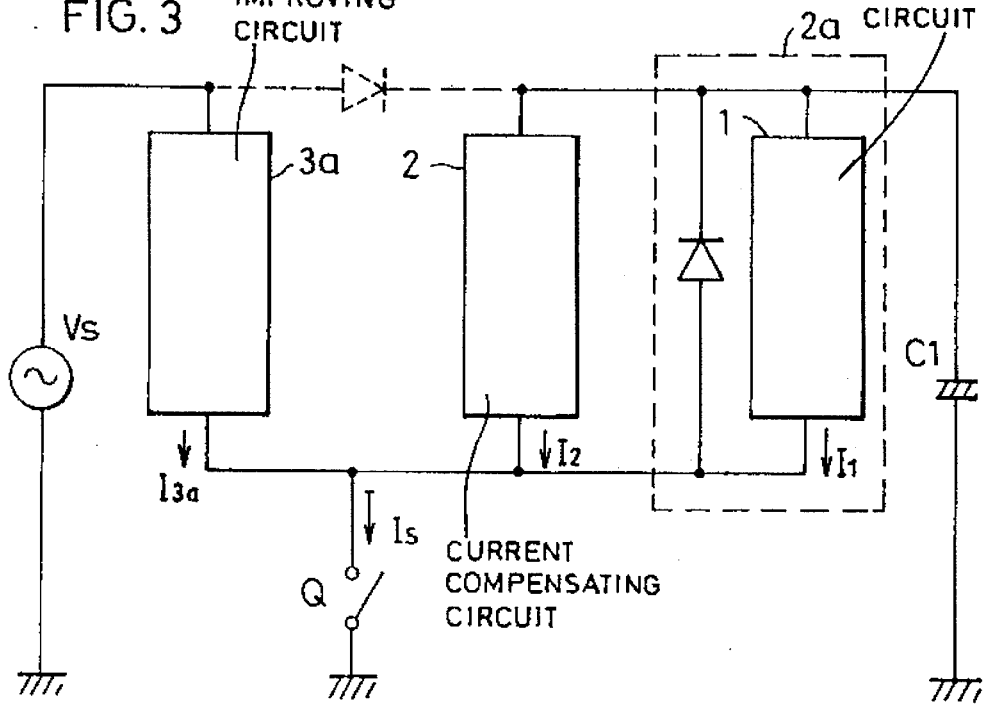
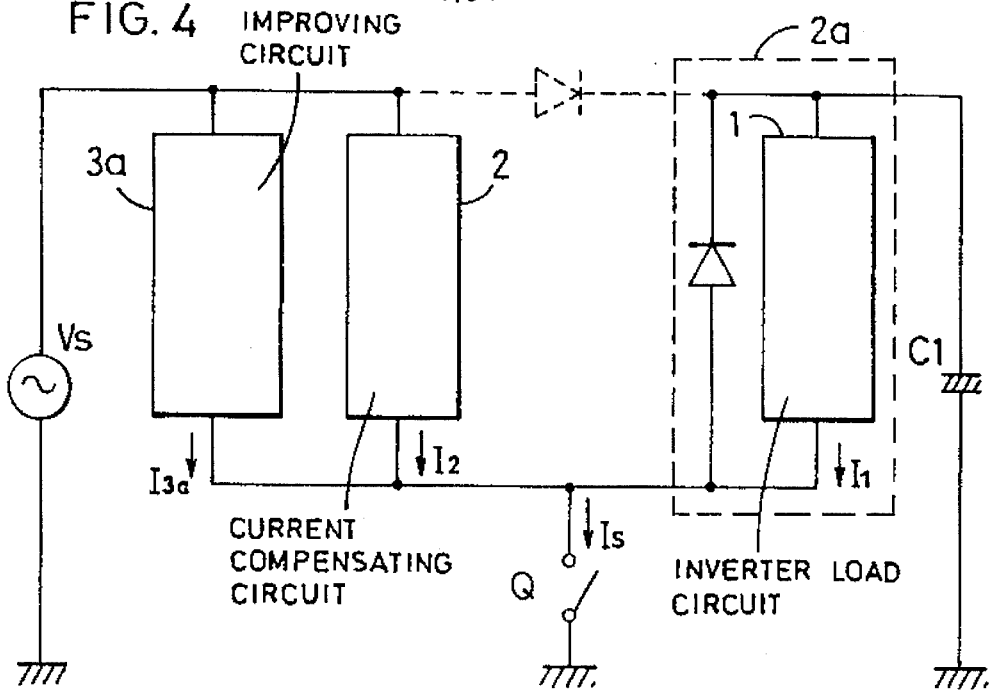

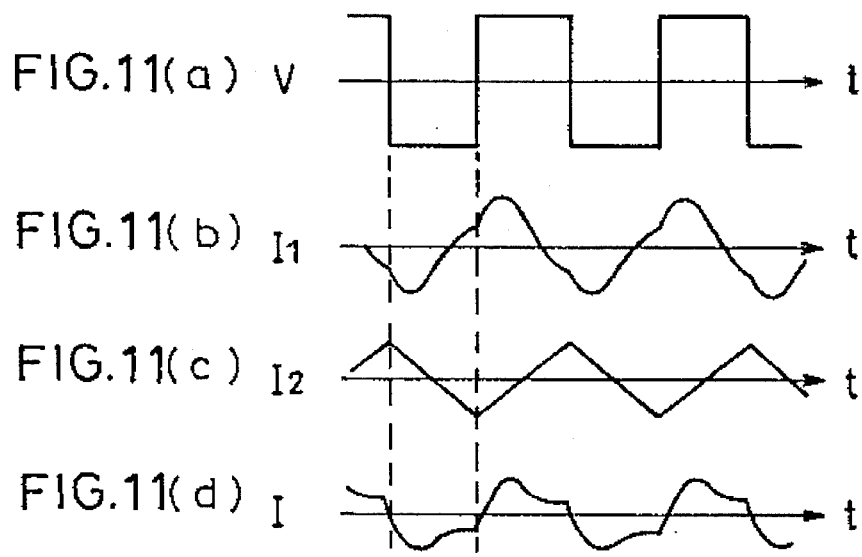
FIG.11(a) V
FIG.11(b) I1
FIG.11(c) I2
FIG.11(d) I
FIG.12
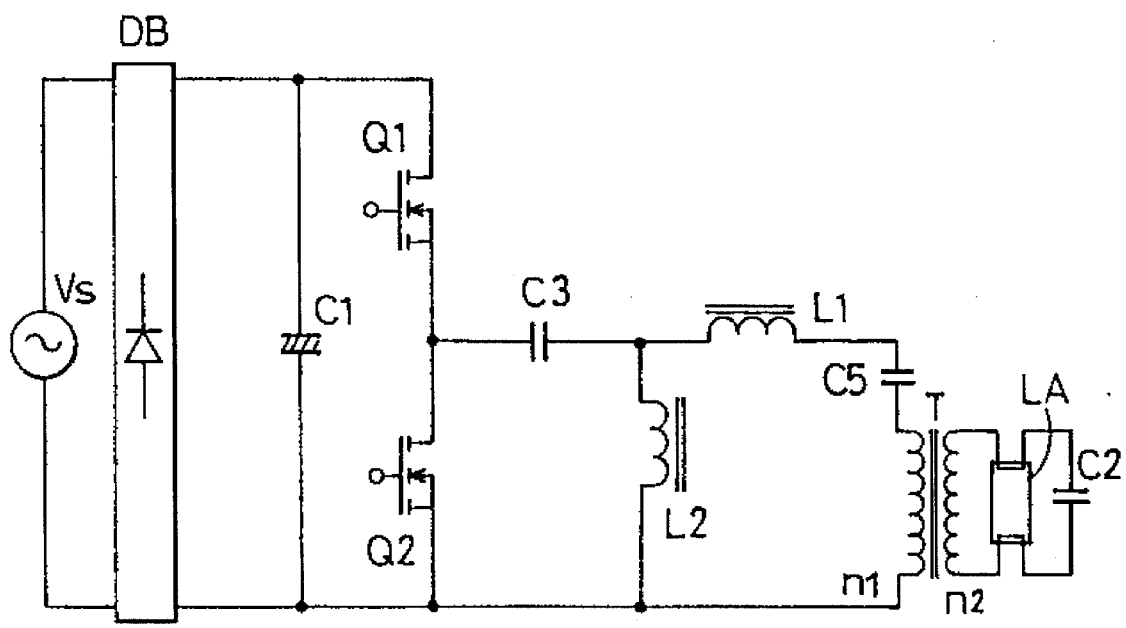

FIG. 14(a) V2 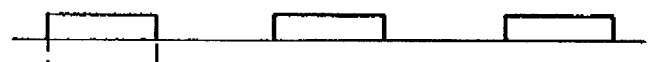
FIG. 14(b) I1 
FIG. 14(c) I2 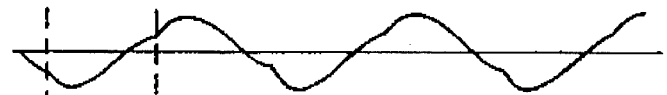
FIG. 14(d) I 
FIG. 15
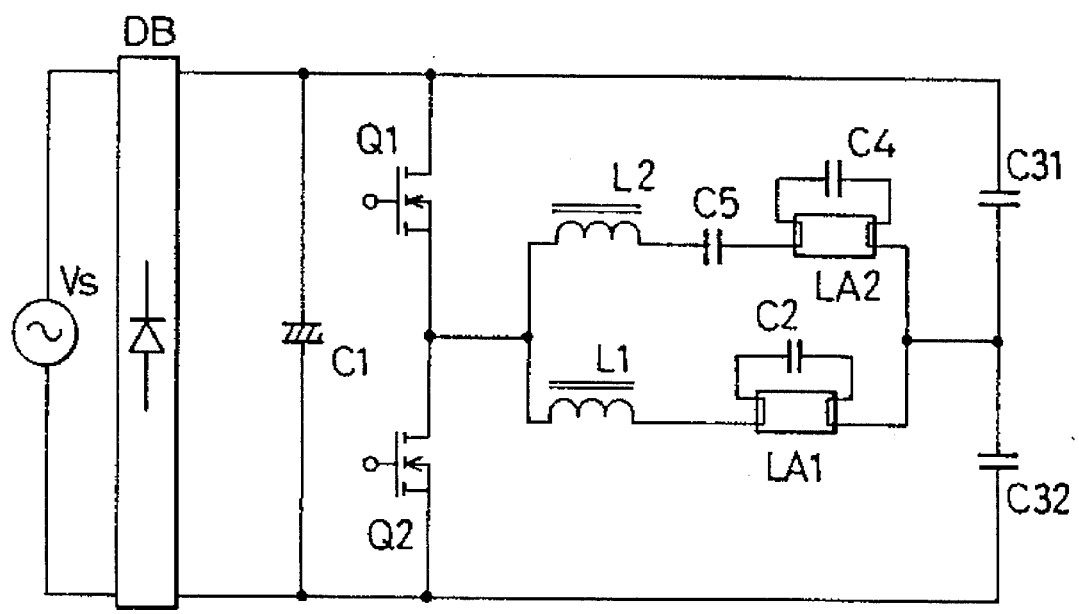

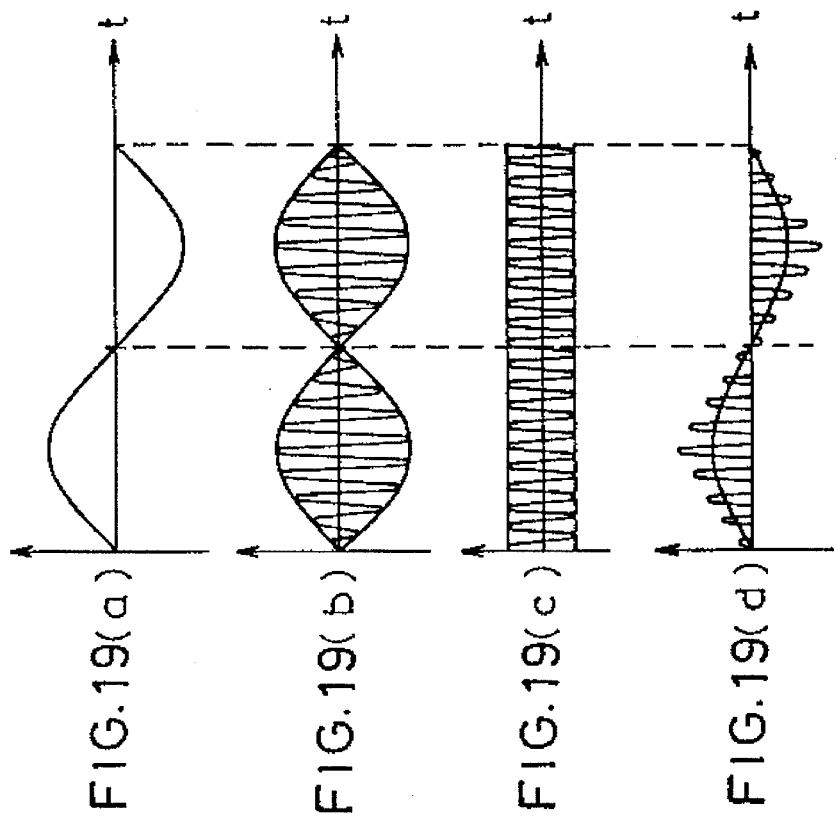
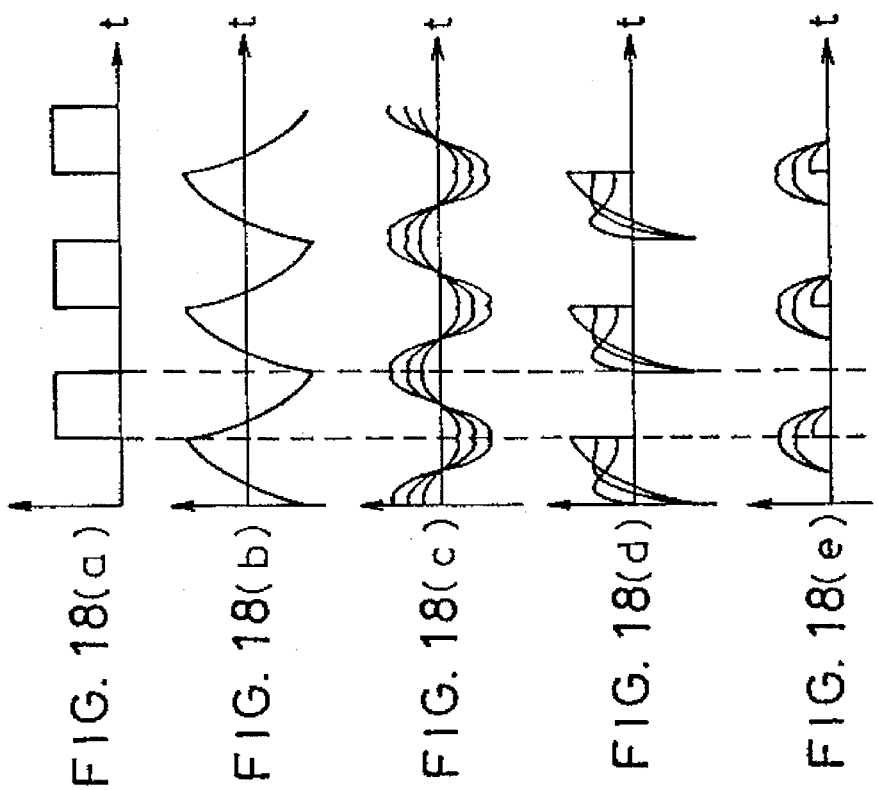

POWER SOURCE DEVICE

BACKGROUND OF THE INVENTION

This invention relates to a power source device which supplies an electric power with any input current distortion improved.

DESCRIPTION OF RELATED ART

Generally, there have been widely used as the power source device ones which include an inverter device of a so-called half bridge type. That is, in the power source device of the kind referred to AC input terminals of a full-wave rectifier are connected to a commercial power source, while a smoothing capacitor is connected to DC output terminals of the full-wave rectifier. Across the smoothing capacitor, a series circuit of switching elements is connected while these switching elements are turned alternately ON and OFF at a high frequency. Across one of the switching elements, a series resonance circuit of a resonating inductor and a resonating capacitor is connected through a DC component cutting capacitor, while a load Z is connected in parallel across the resonating capacitor. A smoothed DC voltage is generated at the smoothing capacitor so that the switching elements are alternately turned ON and OFF, a high frequency rectangular wave voltage V is applied through the DC component cutting capacitor to the load, and a high frequency voltage is supplied to the load due to a resonating action of the resonating inductor and capacitor. In an event where the power source device is employed as an inverter type fluorescent lamp lighting device, a fluorescent-lamp is connected as the load and is to be subjected to a high frequency lighting.

For the respective switching elements, a power MOSFET may be employed, while a bipolar transistor with a diode connected in inverse parallel may also be used. Normally, the respective switching elements are so controlled that an inverter circuit current will be at a delayed phase with respect to the high frequency rectangular wave voltage V. The power factor of the inverter circuit current is, therefore, not to be 1 with respect to the high frequency rectangular wave voltage, and a larger current than that to be supplied to the load is caused to flow, due to which there has arisen a problem that the current made to flow to the switching elements is caused to be large and switching loss is also made larger. There has been a further problem in that a switching element of a large current rating is required to be employed, and a high cost has to be incurred.

In a power source device disclosed in Japanese Patent Laid-Open Publication No. 4-329297, an arrangement is so made that a lagging phase current and an advancing phase current are caused to flow, and their composite current is supplied to the switching elements, while in this prior art the switching currents are made to be of an in-phase mode. In this event, there has arisen a risk that the switching current is put into the advancing phase mode due to such circuitry fluctuation as a load fluctuation, power source fluctuation and the like, and there has been a problem that the switching loss is apt to become larger.

In another known power source device, a full-wave rectifier is connected at its AC input terminals to the AC power source, one of the switching elements is connected through an inductor to DC output terminals of the full-wave rectifier, and a smoothing capacitor is connected through a diode across the particular switching element. An input current in accordance with the input voltage from the AC power source is supplied, and an input distortion improving circuit capable of improving the input distortion is provided. In this case, a voltage boosting chopper circuit is established by means of the inductor, one switching element, diode and smoothing capacitor, while the one switching element is also employed as a switching element of the inverter circuit.

To the smoothing capacitor, a series circuit of a pair of switching elements is connected, and a diode is connected in inverse parallel across each of these switching elements. Across one of these switching elements, an inverter load circuit is connected through a DC component cutting capacitor, and the inverter load circuit includes a series resonance circuit of another resonating inductor and a resonating capacitor, while a load is connected in parallel across the resonating capacitor. The respective switching elements are caused to be alternately turned ON and OFF by a DC voltage from the smoothing capacitor, and a rectangular wave voltage is supplied to the inverter load circuit, whereby a high frequency is caused to flow to the resonating inductor. On the other hand, the foregoing one switching element also acts as a chopper circuit, so that an input current will be caused to flow through the foregoing one of the inductors, the input current distortion is improved, and the smoothing capacitor is charged by an energy accumulated in the foregoing one inductor.

In the foregoing known power source device, a current from the resonating inductor and a current from the foregoing one inductor are made to flow to the foregoing one switching element as superposed on each other so as to be a large current, whereby there is caused a problem to arise in that the power loss or stress is enlarged, at least the foregoing one switching element has to be enlarged in size and the manufacturing costs are made high. Further, as the voltage obtained at the smoothing capacitor is the one boosted, it is required to employ a switching element of a high withstand voltage and, in this respect, too, there arises a problem that the costs become high.

In still another known power source device, a capacitor is connected in series to the foregoing one inductor, whereby the charging energy to the smoothing capacitor will be weakened, and the voltage of the smoothing capacitor is restrained from rising. Referring here to the chopper operation at this time, a turning ON of the one of the switching elements causes an input current to flow from the AC power source through the full-wave rectifier, another capacitor, the one inductor, one switching element and full-wave rectifier, and an energy is accumulated in these another capacitor and one inductor. Next, as the one switching element turns OFF, a current is caused to flow through the one inductor, one diode, smoothing capacitor, full-wave rectifier, another capacitor and one inductor, and the smoothing capacitor and another capacitor are charged by a voltage induced at the one inductor. Further, when the other switching element is turned ON, a current is made to flow through another capacitor, another diode, another switching element, one inductor and another capacitor so that the another capacitor will be a power source, and a current in a reverse direction to that in the previous period is caused to flow to the one inductor. Further, when another switching element is in OFF state, a current is made to flow through the one inductor, another capacitor, another diode, smoothing capacitor, further another diode and one inductor, so that the smoothing capacitor is charged by an induced voltage at the one inductor, and a charge in another capacitor is discharged. Thereafter, the same operation is repeated, and a DC voltage is obtained at the smoothing capacitor. In this case, the arrangement and operation of the inverter circuit are the same as those of the foregoing known art. In the foregoing known power source device, too, there has been a problem that the currents flowing through the resonating inductor and one inductor are supplied as superposed on each other to the respective switching elements so as to render the power loss or stress to be larger and the switching element to be larger in size, and the device has to become costly.

SUMMARY OF THE INVENTION

A primary object of the present invention is, therefore, to provide a power source device which has eliminated the foregoing problems and is capable of improving the power factor of the switching current with respect to the high frequency rectangular wave voltage to render the switching current to be small, allowing a switching element small in the current rating to be utilizable, and realizing a minimization in size of required inverter circuit and eventually in costs for manufacturing the device.

According to the present invention, the above object can be established by means of a power source device in which a DC source power is obtained by rectifying and smoothing an AC source power, a rectangular wave high frequency voltage is output with switching elements of an inverter circuit receiving the DC source power turned ON and OFF at a high frequency, and the rectangular wave high frequency voltage is applied to an inverter load circuit, characterized in that a current compensating circuit for flowing a current substantially of a phase inverse to a current caused to flow through the inverter load circuit by the high frequency voltage is connected in parallel to the inverter load circuit, and a composite current of a current flowing through the inverter load circuit and another current flowing through the current compensating circuit is made to be slightly lagging phase with respect to the high frequency voltage.

Other objects and advantages of the present invention should become clear as the description of the invention advances with reference to preferred embodiments shown in accompanying drawings.

BRIEF DESCRIPTION OF THE DRAWINGS

FIG. 1 is a schematic circuit diagram of an embodiment of the power source device according to the present invention;

FIGS. 2(a)–(e) are explanatory waveform diagrams for the operation at major portions of the power source device of FIG. 1;

FIGS. 3 and 4 are explanatory views for the operation in different aspects employed in the power source device of FIG. 1 respectively;

FIGS. 11(a)–(d) are explanatory waveform diagrams for the operation at major portions in the embodiment of FIG. 10;

FIGS. 12 and 13 are respectively circuit diagrams of other embodiments of the present invention;

FIGS. 14(a)–(d) are explanatory waveform diagrams for the operation at major portions in the circuit of the embodiment of FIG. 13;

FIG. 15 is a circuit diagram of another embodiment of the present invention;

FIGS. 18(a)–(d) are explanatory diagrams for a high frequency operation at major portions in the embodiment of FIG. 17;

FIGS. 19(a)–(d) are explanatory diagrams for a low frequency operation at major portions in the embodiment of FIG. 17;

Figure 5:
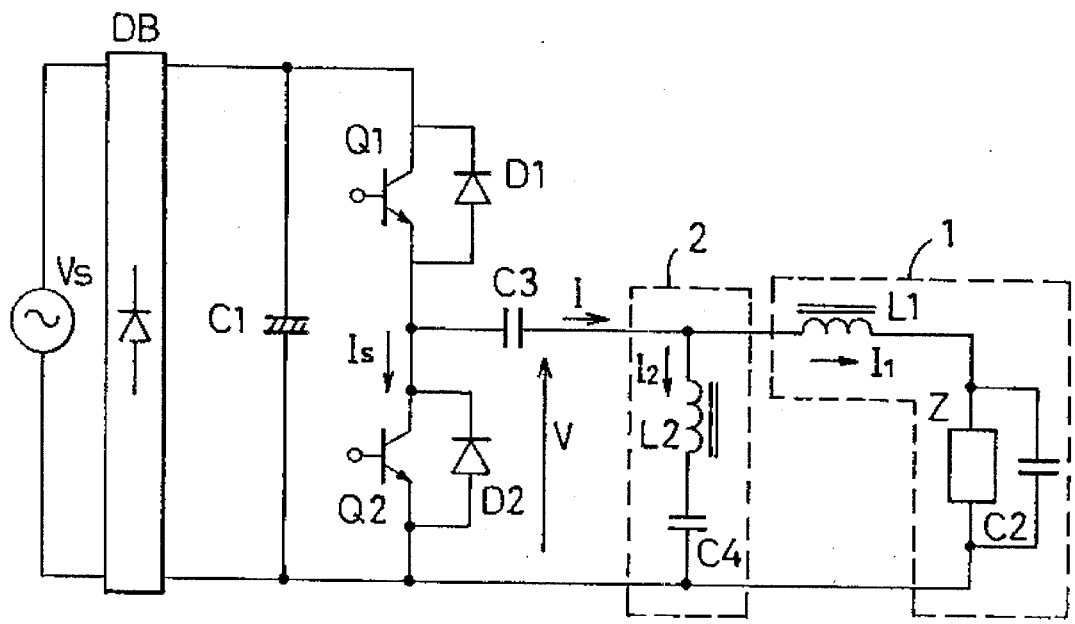
FIG. 5 is a more practical circuit diagram of the power source device of FIG. 1.

While the present invention shall now be described with reference to the embodiments shown in the accompanying drawings, it should be appreciated that the intention is not to limit the invention only to these embodiments shown but rather to include all alterations, modifications and equivalent arrangements possible within the scope of appended claims.

DETAILED DESCRIPTION OF THE PREFERRED EMBODIMENTS

In FIG. 1, there is shown a circuit diagram showing a basic arrangement of the present invention. In this circuit arrangement, AC input terminals of a full-wave rectifier DB are connected to an AC power source Vs, and DC output terminals of the full-wave rectifier DB are connected to a smoothing capacitor C1, and an inverter circuit 3 is connected to this smoothing capacitor C1. The inverter circuit 3 is provided for outputting a high frequency voltage V at an output end of the circuit, which voltage is applied to an inverter load circuit 1 and a current compensating circuit 2. Through the inverter load circuit 1, there flows a current I1 of a lagging phase with respect to the high frequency voltage V so as to be a larger current than a current Iz supplied to a load Z. To the inverter load circuit 1, further, the current compensating circuit 2 is connected in parallel, and is so arranged that there flows a current I2 substantially of an inverse phase to the current I1 to the inverter load circuit 1 and slightly at a lagging phase so that the composite current I will be an inverted current upon inversion of the high frequency voltage V, whereby the composite current I is made small and approximates to a trapezoidal wave of the high frequency voltage V so as to be high in the power factor.

In FIG. 2, there are shown waveforms depicting the operation of the power source device of FIG. 1, that is, the high frequency voltage V appearing at the output end of the inverter circuit 3, the current Iz flowing through the load Z, the current I1 flowing through the inverter load circuit 1, the current I2 flowing through the current compensating circuit 2, and the composite current I of the currents I1 and I2 flowing through the inverter load circuit 1 and current compensating circuit 2. As will be clear from FIG. 2, it is made possible, by rendering the current I2 flowing to the current compensating circuit 2 to be substantially anti-phase with respect to the current I1 caused by the high frequency voltage V to flow to the inverter load circuit 1 for improving the power factor of the composite switching current I, to minimize the switching current I, to thereby minimize the current rating of the switching elements, and to realize the minimization in size and costs of the inverter circuit and eventually the power source device. Further, as the composite current I of the current I1 flowing to the inverter load circuit 1 and the current I2 flowing to the current compensating circuit 2 is slightly of a lagging phase with respect to the foregoing high frequency voltage V, it is made possible to prevent the switching elements from being simultaneously turned ON at the moment upon inversion of the high frequency voltage V, that is, at the moment of turning ON of one of the switching elements. According to the present invention, therefore, the current flowing to the switching elements in the inverter circuit is minimized and the switching loss can be also minimized, so that the element small in the current rating can be used so as to be sufficiently contributive to the minimization in size and costs.

In the power source device for improving the input distortion, in general, an input distortion improving circuit is connected together with the switching elements, so that a chopper circuit will be constituted. While a DC power source is produced with this input distortion improving circuit and further the inverter circuit including the switching elements is connected to this DC power source, this arrangement causes currents to the chopper circuit and to the inverter circuit to flow to the same switching element, and the current to the switching element is apt to become large.

According to one of features of the present invention, on the other hand, the current to the switching element Q forming part of the chopper means and the inverter means in common is reduced so that an arrangement allowing a switching element small in the current rating to be used can be employed.

In this case, as shown in FIGS. 3 and 4, the input distortion improving circuit 3a will be so arranged that the input distortion will be improved by chopping the AC voltage Vs by means of the switching element Q turned ON and OFF at a high frequency and a DC voltage will be obtained at the smoothing capacitor C1. Further, the inverter circuit 2a is provided for generating the high frequency voltage by turning ON and OFF the switching element Q with the DC voltage of the smoothing capacitor C1 supplied, and a high frequency output voltage of the inverter circuit 2a is supplied to the inverter load circuit 1. The current compensating circuit 2 is provided for supplying to the switching element Q used in common by the input distortion improving circuit 3a and inverter circuit 2a a current I2 substantially of an inverse phase to at least one of a current I3a flowing from the input distortion improving circuit 3a and a current I1 flowing from the inverter circuit 2a.

In the circuit of FIG. 3, in this case, the current compensating circuit 2 through which the current of anti-phase flows is connected in parallel to the inverter load circuit 1 and, as the current I1 of the inverter load circuit 1 and the current I2 of the current compensating circuit 2 are mutually inverse in the phase, their composite current (I1+I2) is made small in both of the effective and momentary values. Since this composite current (I1+I2) is made to flow through the switching element Q, this current Is to the switching element Q will be small even when the chopper current I3a is superposed thereon. Accordingly, it is possible to employ as the switching element Q the one of a small current rating.

Further, in the circuit of FIG. 4, it is possible to render the composite current (I3a+I2) of the chopper current I3a and compensating circuit current I2 to be small by connecting the current compensating circuit 2 in parallel to the input distortion improving circuit 3a, so that, even when the current I1 of the inverter load circuit 1 is superposed thereon, the current Is flowing to the switching element Q will be smaller than that in conventional devices.

The power source device of FIG. 1 may be provided with both functions of the arrangements of FIGS. 3 and 4, and the current compensating circuit 2 may be employed concurrently as the input distortion improving circuit 3a or the inverter load circuit 1.

In FIG. 5, there is shown a circuit diagram made more practical than the power source device of FIG. 1, in which the full-wave rectifier DB is connected at its AC input terminals to the AC power source DB, while the smoothing capacitor C1 is connected across the DC output terminals of the full-wave rectifier DB. To this smoothing capacitor C1, a series circuit of a pair of switching elements Q1 and Q2, while diodes D1 and D2 are respectively connected to each of the switching elements Q1 and Q2 in inverse parallel thereto. Across the switching element Q2, the inverter load circuit 1 and current compensating circuit 2 are connected in parallel relationship, through a DC component cutting capacitor C3. The inverter load circuit comprises a series resonance circuit of an inductor L1 and capacitor C2 and, across the resonating capacitor C2, the load Z is connected in parallel. Further, the current compensating circuit 2 comprises a series resonance circuit of an inductor L2 and capacitor C4.

In the present instance, the foregoing switching elements Q1 and Q2 are alternately turned ON and OFF at a high frequency so as to act as a half bridge type inverter, and a high frequency voltage V is generated at an output end of the DC component cutting capacitor C3 and applied to the inverter load circuit 1 and current compensating circuit 2. To the inverter load circuit 1 to which the high frequency voltage V is applied, the high frequency current I1 is caused to flow. The high frequency current I1 is made to be of a lagging phase with respect to the high frequency voltage V and is larger than the current supplied to the load Z. In order to improve the power factor of the current flowing out of the high frequency, the current compensating circuit 2 is connected. This current compensating circuit 2 preferably comprises a series circuit of an inductor L2 and capacitor C4, of which resonance frequency $\frac{1}{2}\sqrt{(L2C4)}$ is set to be higher than the frequency of the high frequency voltage. With this setting, the current I2 flowing to the current compensating circuit 5 is made to be in advanced phase with respect to the high frequency voltage V, and the lagging phase current I1 and advancing phase current I2 are made to flow out of the high frequency voltage V, and their composite current I becomes a current high in the power factor. At this time, the operating waveforms at the major portions are the same as those of FIG. 2, and it should be appreciated that their composite current I is close to the trapezoidal wave and will be the one high in the power factor. Accordingly, the effective value of the current flowing through the switching elements Q1 and Q2 is made smaller than the lagging phase current I1, and the current value upon the turning ON and OFF becomes low so as to minimize the switching loss. Consequently, an element small in the current rating can be used as the switching elements Q1 and Q2, and the dimensional minimization and cost reduction can be effectively attempted.

Figure 6:
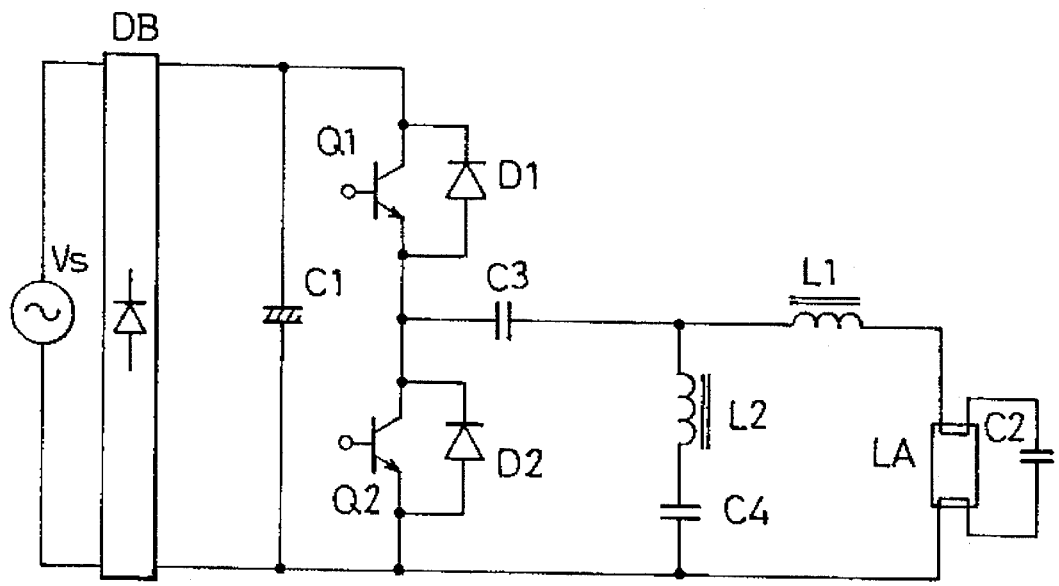
FIGS. 6 through 10 are respectively circuit diagrams showing other embodiments of the present invention.

In another embodiment of the present invention shown in FIG. 6, a discharge lamp LA is employed as the load Z and the device is arranged for a high frequency discharge lamp lighting. In this case, the resonating capacitor C2 is connected to a non-source side terminal of the discharge lamp LA, so that a resonance circuit of the inductor L1 and capacitor C2 will be formed, which circuit functioning also as a filament heating circuit of the discharge lamp LA.

Figure 7:
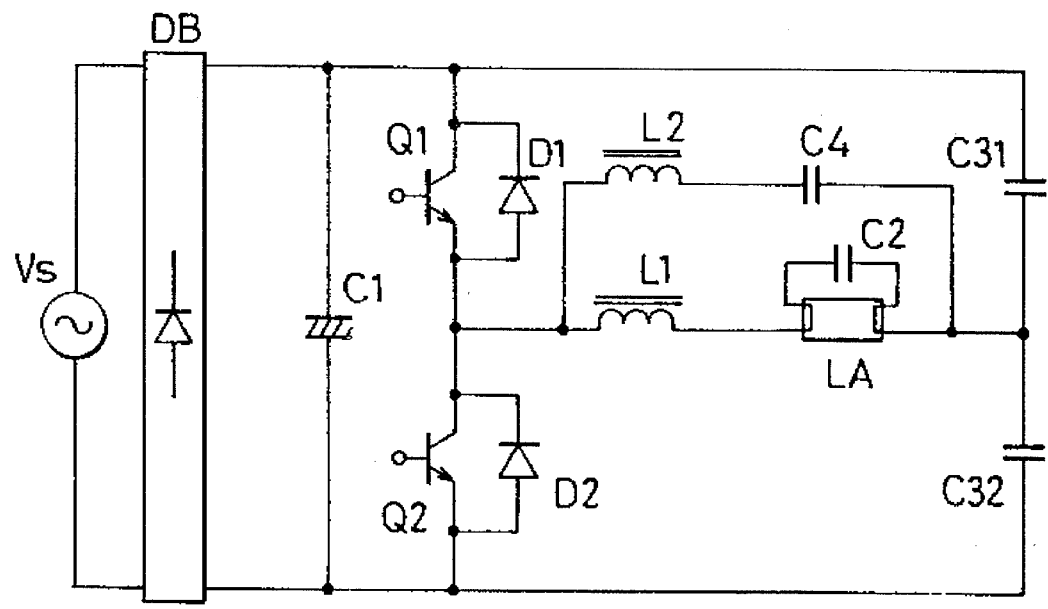

In another embodiment of the invention shown in FIG. 7, there is provided a half-bridge inverter employing two DC component cutting capacitors C31 and C32.

Figure 8:
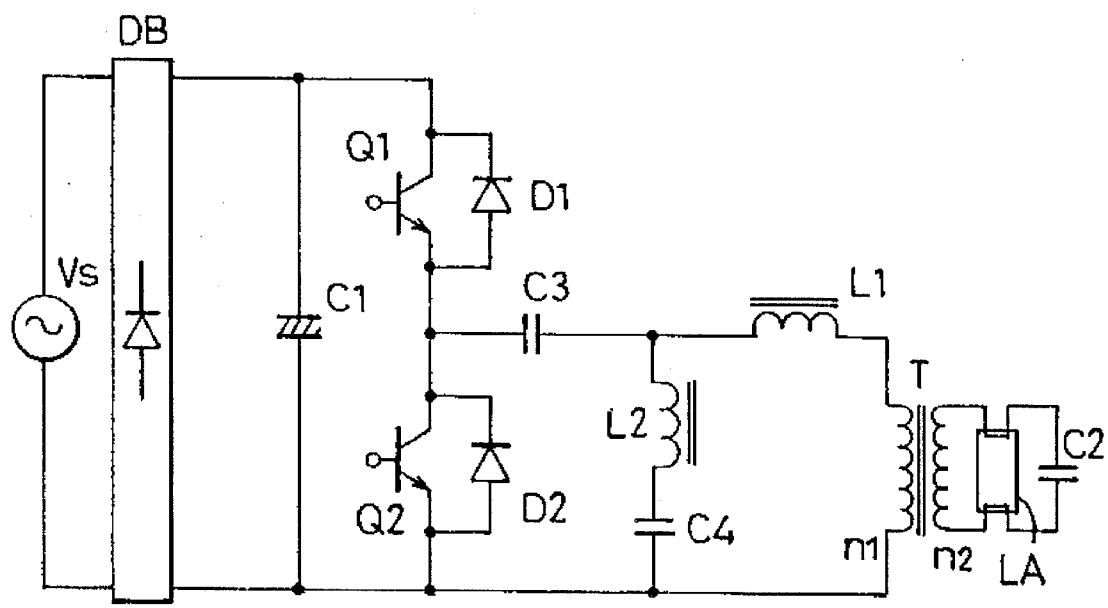

In another embodiment shown in FIG. 8, there is taken a measure for isolating, by means of a transformer T, the discharge lamp LA connected to the output side of the power source device, and this isolation of the discharge lamp LA can allow any electric shock or the like to be prevented.

Figure 9:
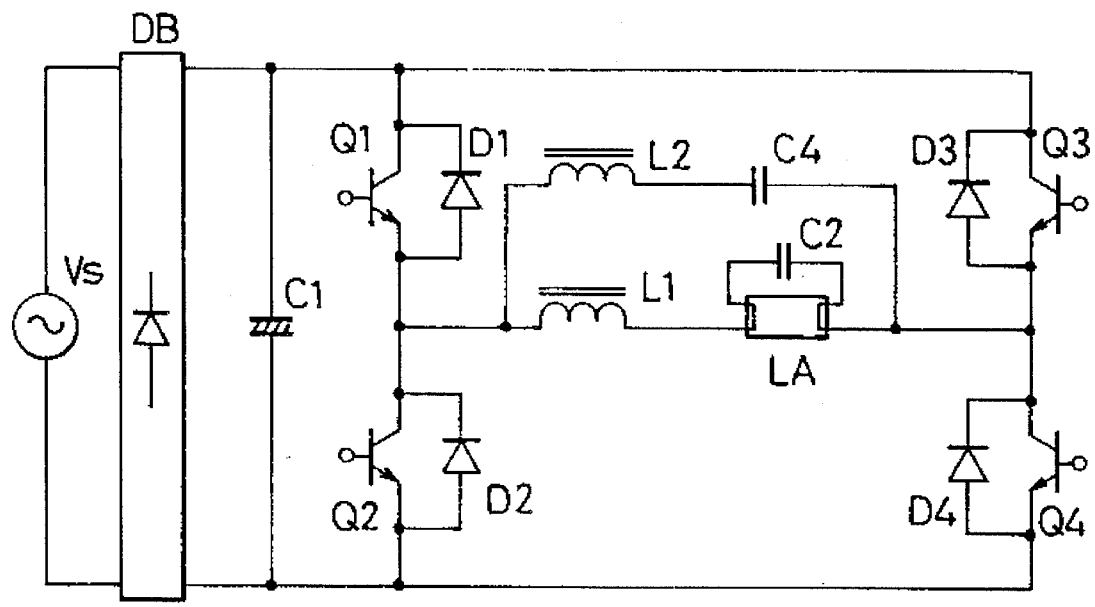

In another embodiment according to the present invention shown in FIG. 9, a full-bridge inverter is formed, as will be clear when the embodiment of FIG. 7 is compared.

In the respective embodiments of FIGS. 6 to 9, other arrangements are the same as those in FIGS. 1 and 5, whereby the effective value of the current flowing to the switching elements Q1 and Q2 is minimized in any embodiment, the switching element of smaller current rating is made employable, and the minimization in size and costs can be effectively attained.

Figure 10:
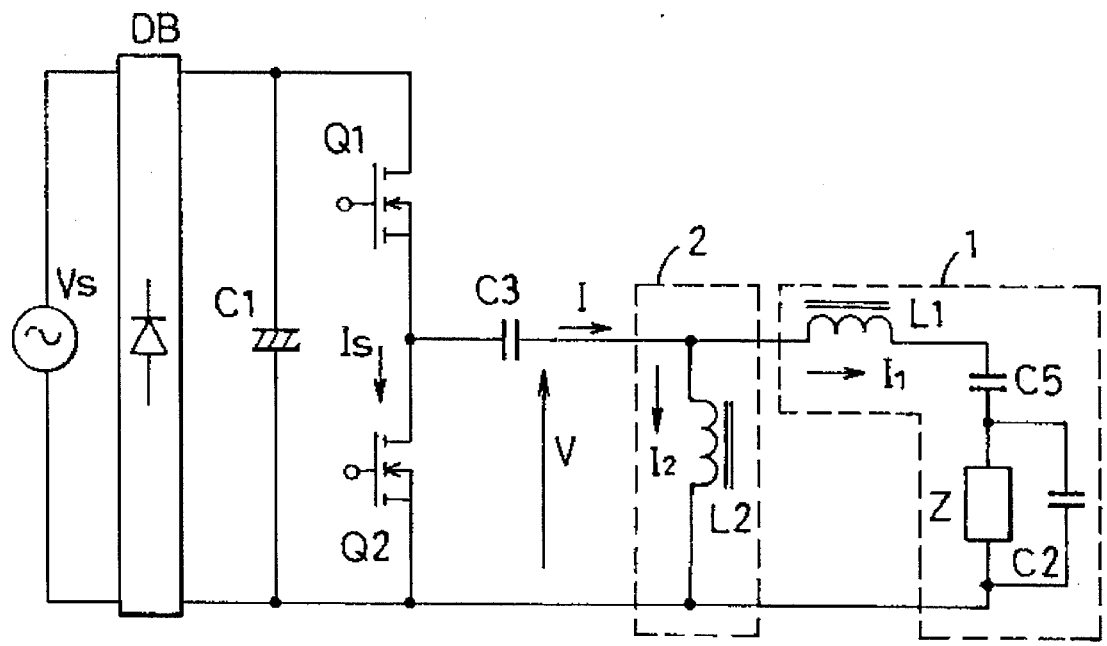

In FIG. 10, there is shown still another embodiment of the present invention, in which the arrangement is so made that, while in the foregoing amendment of FIG. 5 the current I1 of the lagging phase flows to the inverter load circuit 1 and the current I2 of the advancing phase flows to the current compensating circuit 2 upon the application of the high frequency voltage V, the phase relationship of the currents I1 and I2 flowing to the inverter load circuit 1 and current compensating circuit 2 is inverted in the present embodiment, so that the current I1 of the advancing phase will flow to the inverter load circuit 1 and the current I2 of the lagging phase will flow to the current compensating circuit 2. In this arrangement, too, the power factor of the composite current I is elevated, and its effective value can be minimized. In order to render the current I1 of the inverter load circuit 1 to be readily in the advancing phase, there is additionally capacitor C5 provided in series connection and, in order to render the current I2 of the current compensating circuit 2 to be readily in the lagging phase, the inductor L2 only is employed, in the present instance.

In FIG. 11, there are shown operational waveform diagram at respective portions in the present embodiment, that is, there are shown the high frequency voltage V occurring at the output end of the capacitor C3, the current I1 flowing through the inverter load circuit 1, the current I2 flowing through the current compensating circuit 2, and the composite current I of these currents I1 and I2 flowing to the inverter load circuit 1 and current compensating circuit 2. Desired phase relationship between the currents in the present embodiment can be established by selectively setting the circuit constants of the inductor L1, capacitor C2, inductor L2 and capacitor C2, whereby the same effect as that in the foregoing embodiment of FIG. 5 can be obtained, as will be appreciated. Further, in the present embodiment, MOSFET's are employed desirably as the switching elements Q1 and Q2 and, when their incorporating diodes are utilized, the diodes in the inverse parallel connection may be omitted.

Another embodiment of the present invention in FIG. 12 is arranged for use with a high frequency discharge lamp, with the discharge lamp LA employed as the load Z. In this case, there is taken a measure for isolating the discharge lamp LA by means of the transformer T, and the capacitor C2 is connected to the non-source side terminal of the discharge lamp LA. With this embodiment, too, the same function and effect as those in the embodiment of FIG. 10 can be realized.

Figure 13:
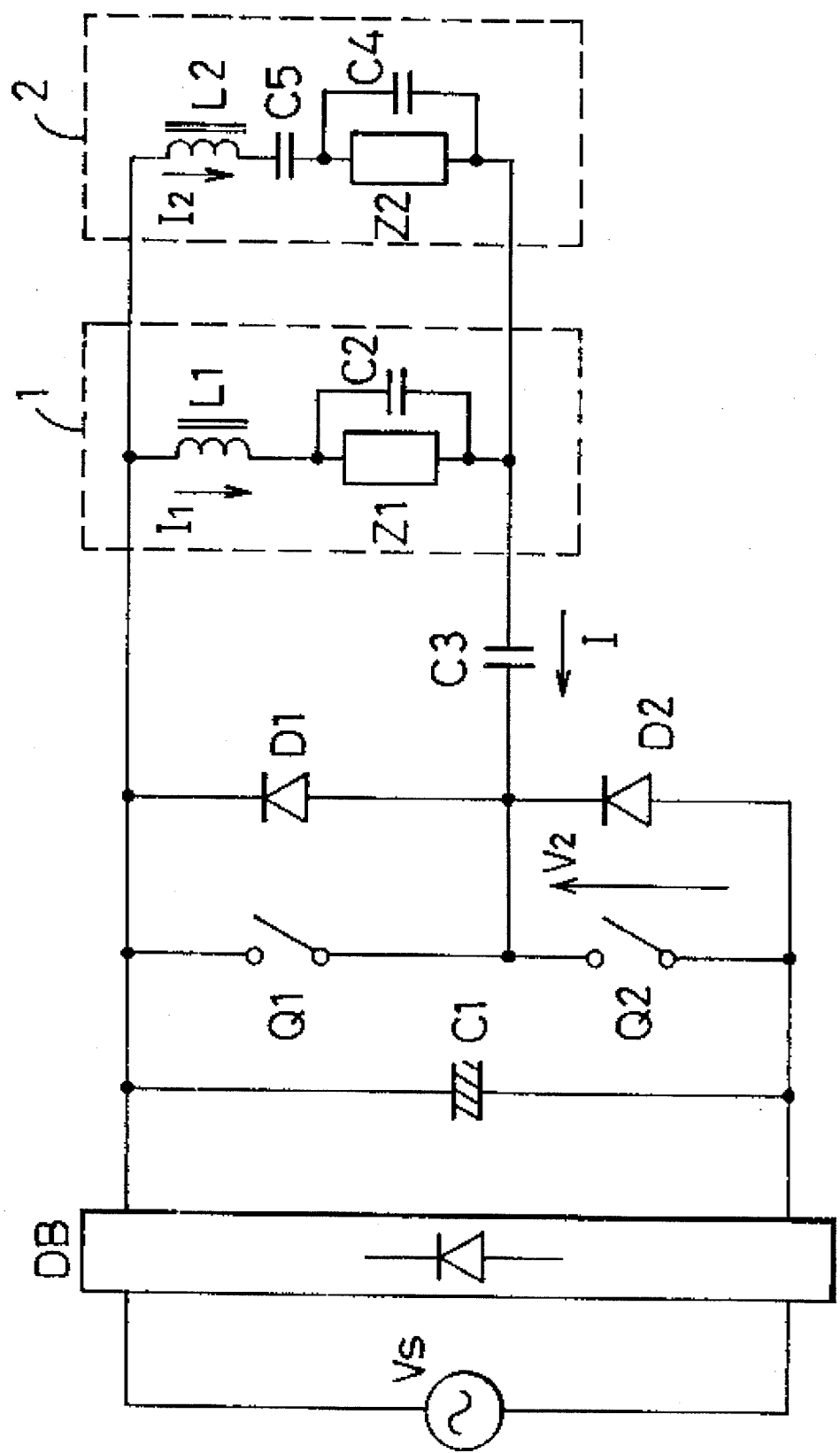

In another embodiment of the present invention as shown in FIG. 13, the inverter load circuit 1 and current compensating circuit 2 are connected in parallel, through the DC component cutting capacitor C3, to both ends of one switching element Q1. The inverter load circuit 1 includes the series resonance circuit of the inductor L1 and capacitor C2 and, across the resonating capacitor C2, the load Z1 is connected in parallel. The current compensating circuit 2 basically comprises the series resonance circuit of the inductor L2 and capacitor C4 and, connecting a load Z2 in parallel with the capacitor C4, a second inverter load circuit is also constituted. Further, the capacitor C5 is inserted in series with the inductor L2, and the current I2 flowing to the current compensating circuit 2 is made to be in the advancing phase with respect to the applied voltage, whereas the current I1 flowing to the inverter load circuit 1 is made a lagging phase with respect to the applied voltage.

In FIG. 14, there are shown operational waveform of the circuit shown in FIG. 13, that is, the voltage V2 across the switching element Q2, the current I1 flowing to the inverter load circuit 1, the current I2 flowing to the current compensating circuit 2, and the composite current I of the currents I1 and I2 to the inverter load circuit 1 and current compensating circuit 2 are shown. Here, it is possible to reduce the composite current I of the current I1 to the inverter load circuit 1 and the current I2 to the current compensating circuit 2, by means of a phase difference between both currents I1 and I2. Further, it is made possible to supply an electric power to the two loads with a far less switching current than in the case of supplying the power to two in-phase loads connected in parallel, whereby the minimization in size and costs of the switching elements Q1 and Q2 can be realized and, as the current compensating circuit 2 acts also as the inverter load circuit 1, the minimization in size and costs of the circuit can be also realized.

In another embodiment of the present invention as shown in FIG. 15, a half-bridge inverter is constituted with the DC component cutting capacitors C31 and C32. Further, the discharge lamps LA1 and LA2 are employed as the loads Z1 and Z2, the capacitors C2 and C4 are connected to the non-source side terminals of the discharge lamps LA1 and LA2, and the resonating capacitors and filament heating circuits are constituted. With the use of MOSFET preferably as the switching elements, it is made possible to omit the diodes D1 and D2.

In this embodiment, too, the same effect as that in the embodiment of FIG. 13 can be realized.

Figure 16:
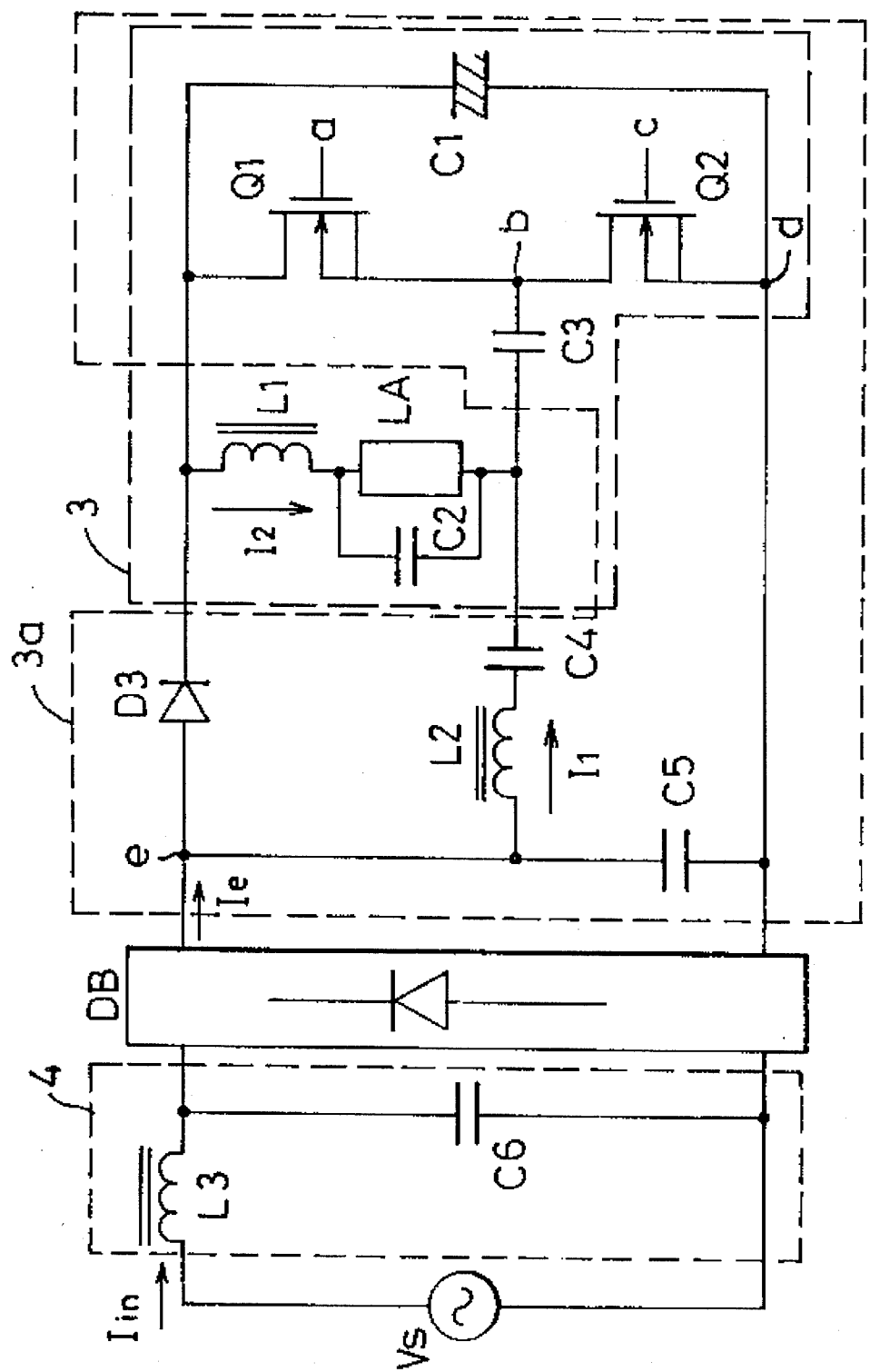
FIG. 16 is a circuit diagram of another embodiment of the power source device according to the present invention.

In another embodiment of the present invention as shown in FIG. 16, the AC input terminals of the full-wave rectifier DB are connected through a filter circuit 4 to the AC power source Vs. The filter circuit 4 comprises an inductor L3 and a capacitor C6 and prevents any noise due to the switching current from flowing out to the AC power source Vs. To the DC output terminals of the full-wave rectifier DB, the smoothing capacitor C1 is connected through the diode D3 and, to the smoothing capacitor C1, the series circuit of the switching elements Q1 and Q2 is connected in parallel. The switching elements Q1 and Q2 are alternately turned ON and OFF at a high frequency. Across the switching element Q1, the series resonance circuit of the inductor L1 and capacitor C2 is connected through the DC component cutting capacitor C3, and the load LA is connected in parallel to the capacitor C2. For the load LA, a discharge lamp may be used. A circuit comprising the switching elements Q1 and Q2, inductor L1 and capacitors C1–C3 is constituting an inverter circuit 2a.

In this embodiment, the input distortion improving circuit 3a is employed and, to the DC output terminals of the full-wave rectifier-DB, the capacitor C5 is connected. To a connecting point of the full-wave rectifier DB to the diode D3, an end of a series circuit of the inductor L2 and capacitor C4 is connected, and the other end of this series circuit of the inductor L2 and capacitor C4 is connected to a connecting point of the DC component cutting capacitor C3 to the load LA.

Figure 17:
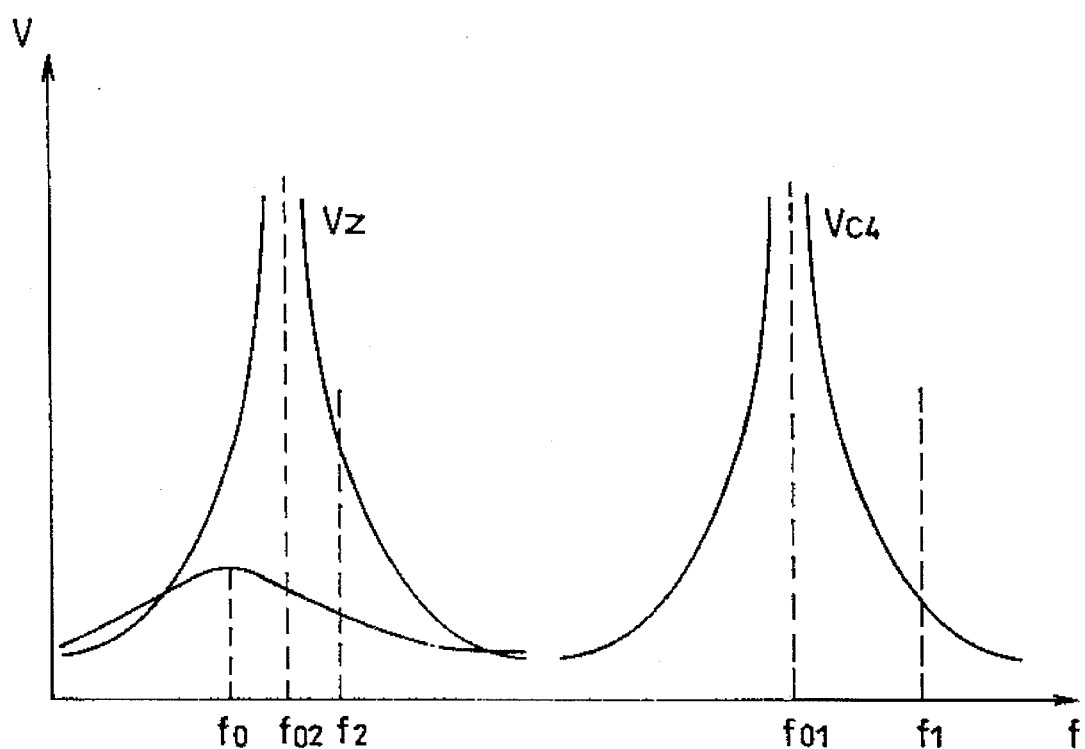
FIG. 17 is an explanatory diagram for the operation at major portions in the circuit of FIG. 16.

Referring also to FIG. 17, there is shown variation in the voltage within the circuit in accordance with variation in oscillating frequency f of the switching elements Q1 and Q2 in the embodiment of FIG. 16, in which a voltage Vz generated across the load LA of the inverter circuit 2a and a voltage Vc generated at the capacitor C4 in the input distortion improving circuit 3a are shown.

In FIG. 18, there are shown high-frequency operational waveforms at major portions in the circuit of FIG. 16, that is, (a) shows a voltage across the switching elements Q2, (b) denotes the current flowing to the inductor L1, (c) shows the current flowing to the inductor L2, (d) denotes the current of the switching element Q2, and (e) shows the output current Ie of the full-wave rectifier DB.

In FIG. 19, there are shown low-frequency operational waveforms at major portions in the circuit of FIG. 16, that is, in (a) the voltage of the AC power source Vs, in (b) the current to the inductor L2, in (c) the current to the load LA, and in (d) a current Iin from the AC power source Vs.

Further, circuit operation of the present embodiment shall be further described. First, the description shall be made with reference to the operation in a period when the voltage of the DC power source Vs is high. In an event when the switching element Q2 is ON and the switching element Q1 is OFF, there flows in the inverter circuit 2a a regenerative current through a path from the inductor L1 through the capacitor C1, switching element Q2, capacitor C3 and capacitor C2 to the load LA. Thereafter, a current flows through a path from the capacitor C1 through the inductor L1, capacitor C2 as well as load LA and capacitor C3 to the switching element Q2. In the input distortion improving circuit 3a, on the other hand, there flows an input current from the AC power source Vs, and a current flows through a path of the full-wave rectifier DB, inductor L2, capacitor C4, capacitor C3 and switching element Q2. This current is made to be an advancing phase current determined by the inductor L2 and capacitor C4. That is, there is caused at this time such input current as shown in FIG. 18(e) to flow. Thereafter, a charge is sufficiently accumulated in the capacitor C4, and a current flows from the capacitor C4 as a power source through a path of the inductor L2, diode D3, capacitor C1, switching element Q2 and capacitor C3. At this time, the capacitor C1 is to be charged.

Next, in an event when the switching element Q1 is ON and the switching element Q2 is OFF, a regenerative current flow in the inverter circuit 2a through a path from the inductor L1 through the capacitor C2 as well as load LA and capacitor C3 to the switching element Q1. Thereafter, a current flows from the capacitor C3 through a path of the capacitor C2 as well as the load LA, inductor L1 and switching element Q1. In the input distortion improving circuit 3a, a current flows from the capacitor C4 through a path of the inductor L2, diode D3, switching element Q1 and capacitor C3, which current is made to be an advancing phase current determined by the inductor L2 and capacitor C4. Thereafter, as a sufficient charge is accumulated in the capacitor C4, there flows a current from the capacitor C4 and AC power source Vs as the power source through a path of the full-wave rectifier DB, inductor L2, capacitor C4, capacitor C3, switching element Q1 and capacitor C1. At this time, the input current is caused to flow from the AC power source Vs, and the capacitor C1 is to be charged simultaneously.

Then, the description shall be made with reference to the operation in a period in which the voltage of the AC power source Vs is low. First, in an event when the switching element Q2 is ON and the switching element Q1 is OFF, the operation of the inverter circuit 2a and input distortion improving circuit 3a is the same as that in the event when the voltage of the AC power source Vs is high. Next, in an event when the switching element Q1 is ON and the switching element Q2 is OFF, the operation of the inverter circuit 2a is the same as that in the event when the voltage of the AC power source Vs is high. In the input distortion improving circuit 3a, further, a current flows from the capacitor C4 through a path of the inductor L2, diode D3, switching element Q1 and capacitor C3, which current is made to be of an advancing phase determined by the inductor L2 and capacitor C4. Thereafter, as a charge is sufficiently accumulated in the capacitor C4, a current flows from the capacitors C4 and C5 as a power source through a path of the inductor L2, capacitor C4, capacitor C3, switching element Q1 and capacitor C1. At this time, the voltage of the capacitor C5 is always equal to the full-wave rectified voltage of the power from the AC power source Vs, so that the capacitor C5 discharges its charge. At this time, the input current pauses, in contrast to the event where the voltage of the AC power source is large. Further, the current flowing through the inductor L2 is determined by the capacitor C5, inductor L2 and capacitor C4 but, as the voltage of the AC power source Vs is low and thus the current value is also low, any influence of the switching element on the current will be less.

With the foregoing series of operation repeated, the current flowing to the switching elements Q1 and Q2 is made to be the composite current of the advancing phase current flowing through the input distortion improving circuit 3a and the lagging phase current flowing through the inverter circuit 2a, so that it becomes possible to remarkably reduce the value of the composite current through their mutual cancellation, and also to reduce the power loss occurring at the switching elements. It is also enabled to reduce the costs accompanying the reduction in the current rating in respect of the switching element. The current flowing through the load LA is out of such flat waveform as shown in FIG. 19(c) since the load circuit is constituted independently of the AC power source Vs. Further, the waveform of the current flowing from the full-wave rectifier DB becomes the one having pause periods as shown in FIG. 18(e), its amplitude varies in response to the magnitude of the AC power source Vs, and, in particular, the pause period is elongated during periods in which the AC power source Vs is low. When this is reviewed in the sense of low frequency, the waveform will be as shown in FIG. 19(d). The current is subjected to a removal of the high frequency component at the filter circuit 4, whereby the input current is made to be sinusoidal, and an input current high in the input power factor and less in the high frequency component can be obtained.

Figure 20:
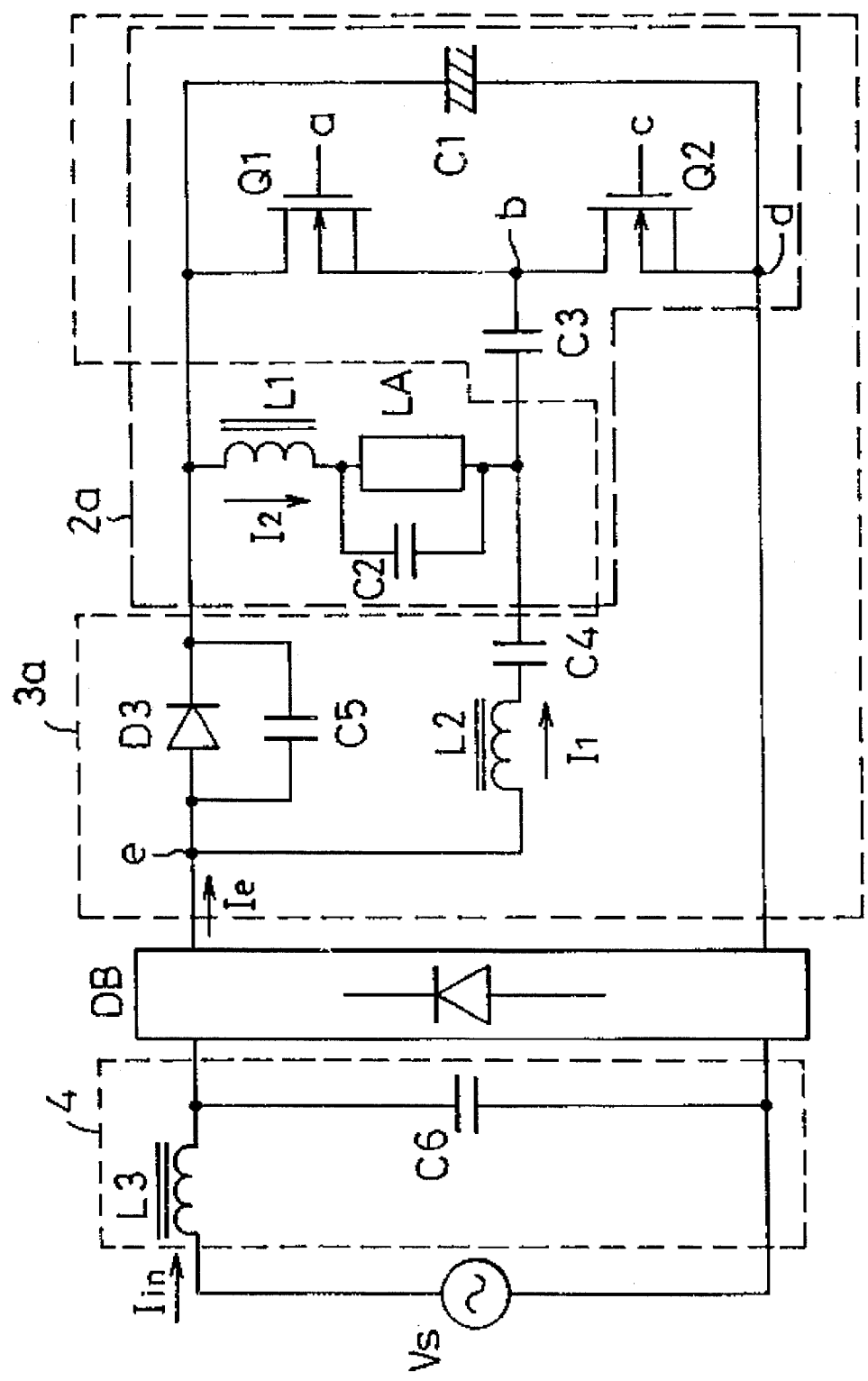
FIGS. 20 through 26 are respectively circuit diagrams showing other embodiments of the present invention.

In another embodiment of the present invention as shown in FIG. 20, the capacitor C5 is connected across the diode D3 in parallel therewith, in contrast to the foregoing embodiment of FIG. 16 in which the capacitor C5 is connected between the DC output terminals of the full-wave rectifier DB. Since the capacity of the capacitor C5 is smaller enough than the capacitor C1, the full-wave rectified voltage from the AC is to be applied, the operation is substantially equal to that in the embodiment of FIG. 16, and the description of the operation with reference to FIGS. 17–19 is also applicable to the present embodiment. That is, the operation in the periods in which the voltage of the AC power source Vs is high will be the same as that in the embodiment of FIG. 16 and, even in the period when the voltage of the AC power source Vs is low, too, the operation in the event where the switching element Q2 is ON and the switching element Q1 is OFF will be the same as that in the embodiment of FIG. 16. Further, in the event when the switching element Q1 is ON and the switching element Q2 is OFF, there flows in the input distortion improving circuit a current flows from the capacitor C4 through a path of the inductor L2, diode D3, switching element Q1 and capacitor C3, which current is to be of an advanced phase determined by the inductor L2 and capacitor C4. Thereafter, as the charge is sufficiently stored in the capacitor C4, a current flows from the capacitor C4 as the power source through a path of the inductor L2, capacitor C4, capacitor C3 and switching element Q1. At this time, unlike the embodiment of FIG. 16, the current loop for charging the capacitor C1 is absent. On the other hand, the current flowing through the inductor L2 involves almost no change.

With the series of foregoing operation, the current flowing to the switching elements Q1 and Q2 is made to be the composite current of the advancing phase current flowing through the input distortion improving circuit 3a and the lagging phase current flowing through the inverter circuit 2a, whereby it is made possible to remarkably reduce the composite current value with these currents mutually cancelled, and to reduce the power loss occurring at the switching element. It is also enabled to reduce the manufacturing costs, accompanying the lowering of the current rating of the switching element. The current flowing through the load LA is rendered to be of such flat waveform having less ripple as shown in FIG. 19(c), since the load circuit is constituted independently of the AC power source. Further, the current flowing out of the full-wave rectifier DB is made to have such waveform having pausing periods as shown in FIG. 18(e), the amplitude of which varies in response to the magnitude of the AC power source Vs so that, in the periods when the AC power source Vs is low, in particular, the pausing periods are prolonged. Such varied waveform will be as shown in FIG. 19(d) as viewed in the sense of low frequency. Through the removal of the high frequency component at the filter circuit 4, it is made possible to obtain the sinusoidal input current, which is high in the input power factor and less in the high frequency component.

Figure 21:
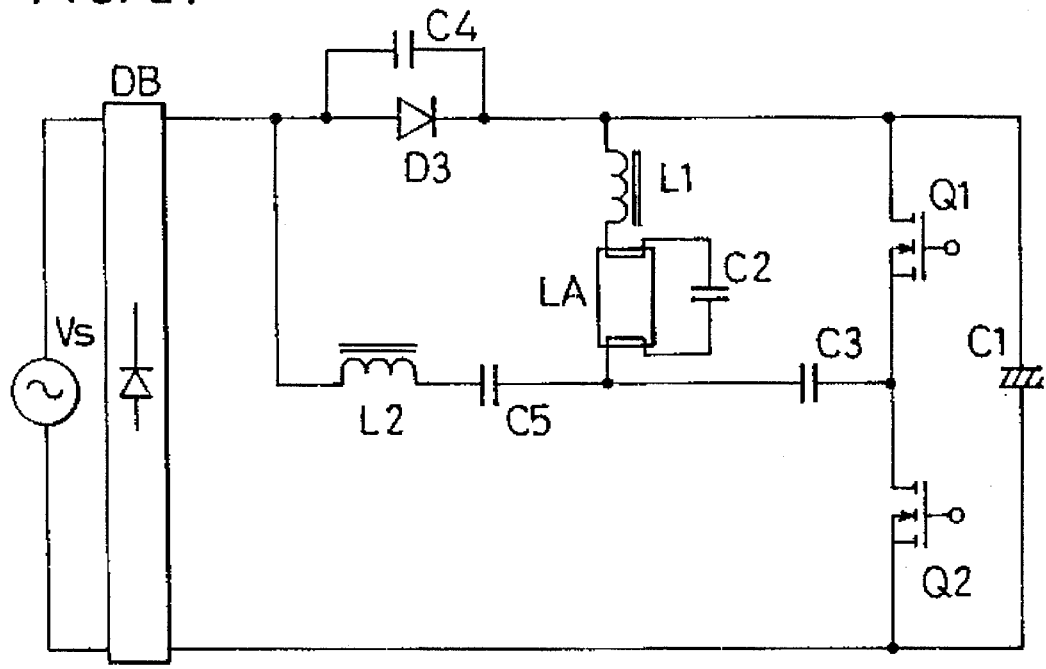

In another embodiment of the present invention shown in FIG. 21, the discharge lamp LA is employed as the load, and a power source device for use with the discharge lamp. Further, the capacitor C2 is connected to the non-source side terminals of the discharge lamp LA, so as to form the resonating elements of the inductor L1 and capacitor C2, while forming also the filament heating circuit.

Figure 22:
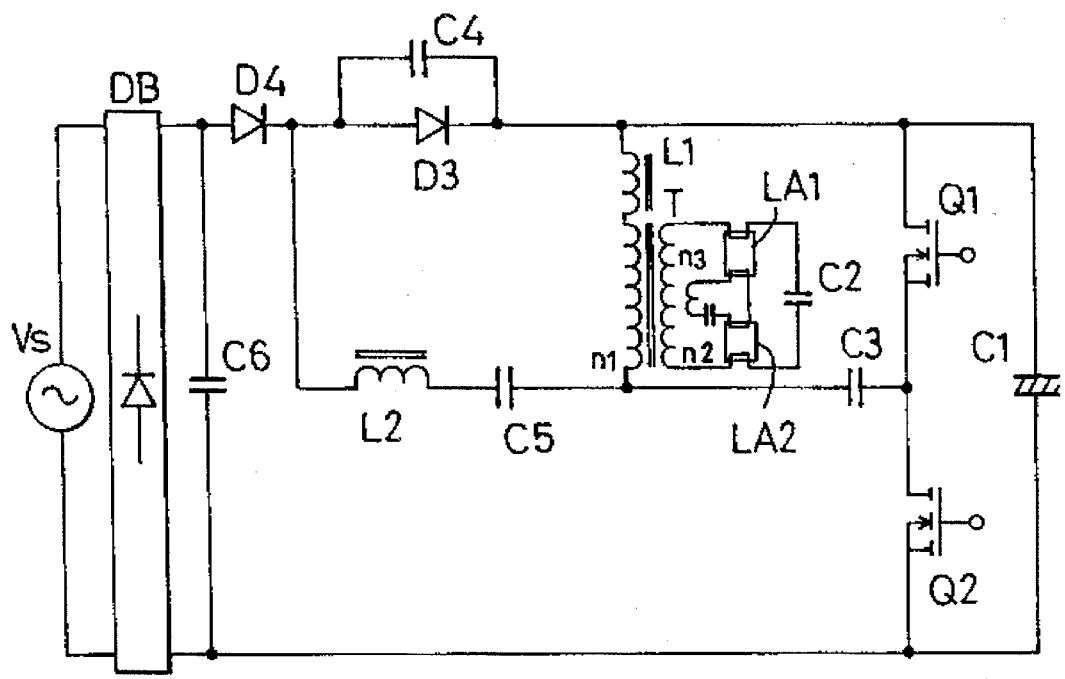

In another embodiment of the present invention as in FIG. 22, two discharge lamps LA are employed, in an isolated arrangement by means of a transformer T. The capacitor C2 is connected to the non-source side terminals of the discharge lamps LA1 and LA2, so as to form the resonating capacitor and concurrently the filament heating circuit. Intermediate filaments are mutually connected through a winding n3 provided in the transformer T, which winding n3 forming the heating circuit.

Further, the capacitor C6 and diode D4 are connected to the output terminals of the full-wave rectifier DB, and the diode D4 consists of a fast recovery diode preferably. For the capacitor C6 across the output terminals of the rectifier DB, a capacitor of a capacity large enough for causing almost no voltage fluctuation under a high frequency current flowing through the diode D4 in response to the turning ON and OFF of the switching elements Q1 and Q2, and small enough for allowing a pulsating voltage obtained by rectifying the commercial power source voltage to appear, whereby it is made possible to employ the full-wave rectifier DB of a low speed, small and inexpensive type.

Figure 23:
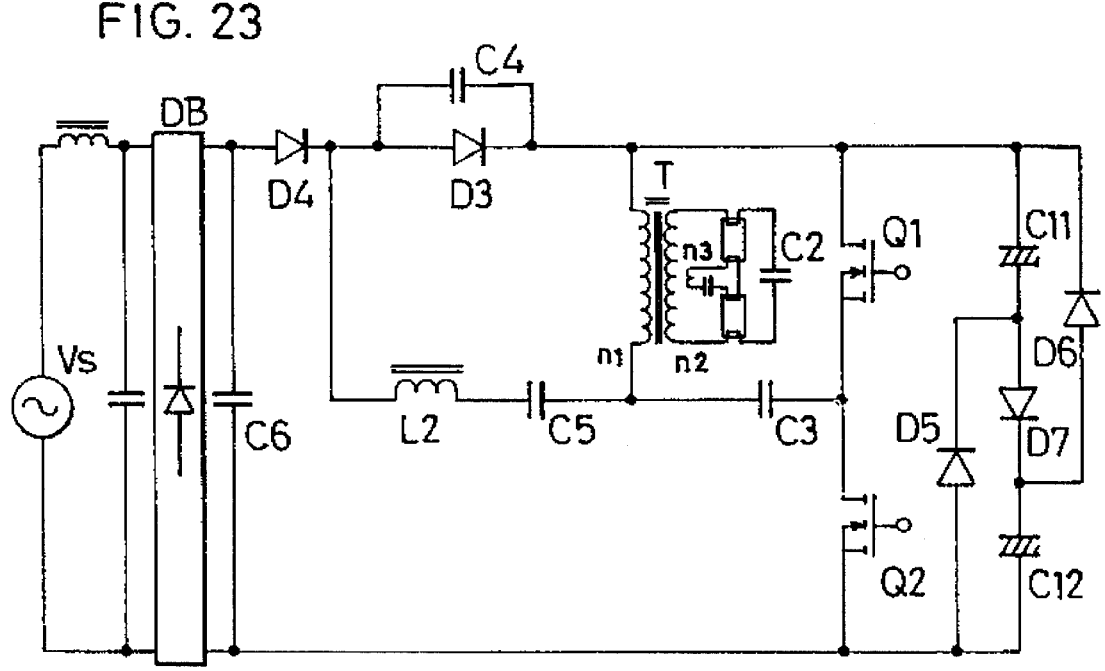

In another embodiment of the present invention as in FIG. 23, the transformer T in the embodiment of FIG. 22 is replaced by a leakage transformer, the resonating inductor L1 is omitted, and the smoothing capacitor C1 is changed to partial smoothing power source (capacitors C11 and C12 and diodes D5, D6 and D7). With this arrangement, the voltage applied to the inverter circuit 2a is lowered so that it is possible to employ circuit parts which are low in the withstand voltage.

Figure 24:
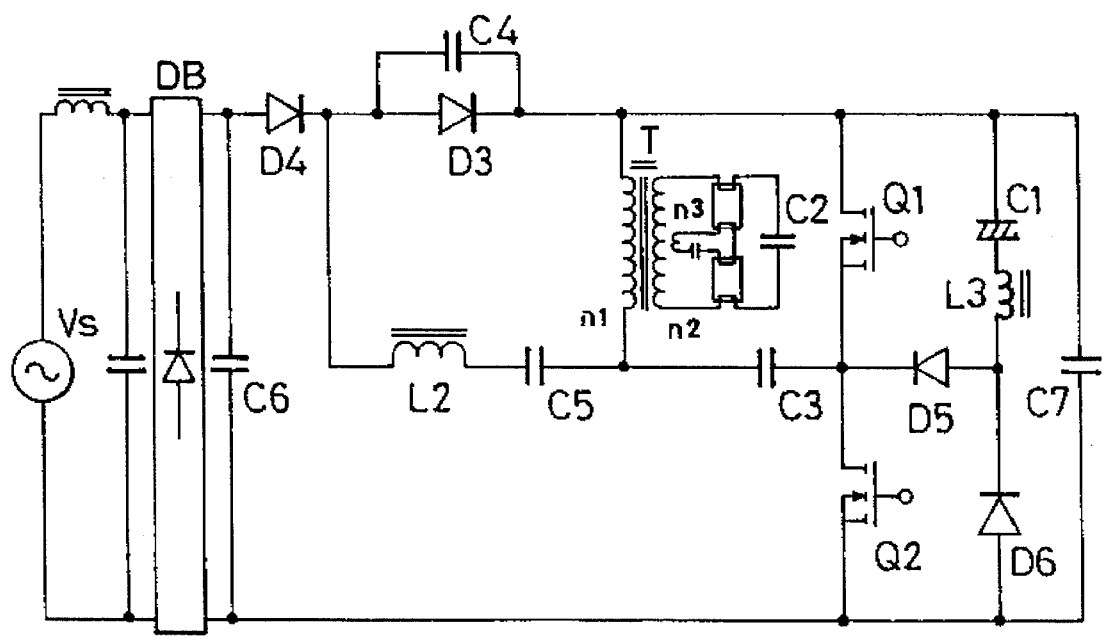

In another embodiment of the present invention as shown in FIG. 24, a partial smoothing power source of a voltage drop chopper is employed in place of the partial smoothing power source of FIG. 23. The inductor L3 forms the voltage drop chopper use inductor, and the switching element Q2 also acts as the voltage drop chopper use switching element. With this arrangement, the supplied current to the electrolytic capacitor upon the connection to the power source can be restrained by controlling the switching element Q2.

Figure 25:
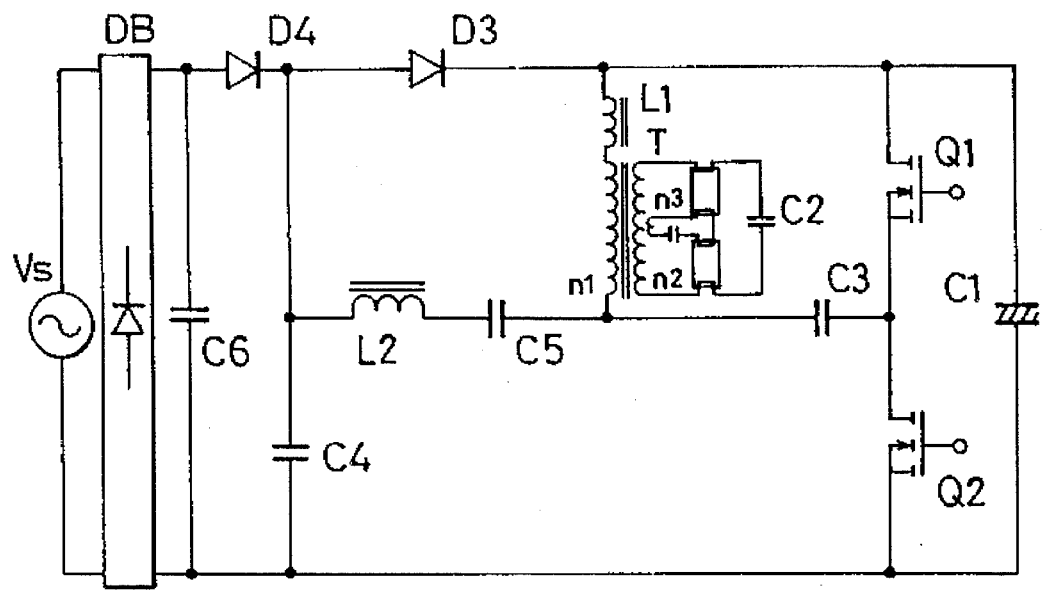

In another embodiment of the present invention of FIG. 25, the discharge lamp LA in the embodiment of FIG. 16 is arranged as isolated with the transformer T interposed. At this time, the transformer T and discharge lamp LA are arranged in the same manner as in the embodiment of FIG. 22.

Figure 26:
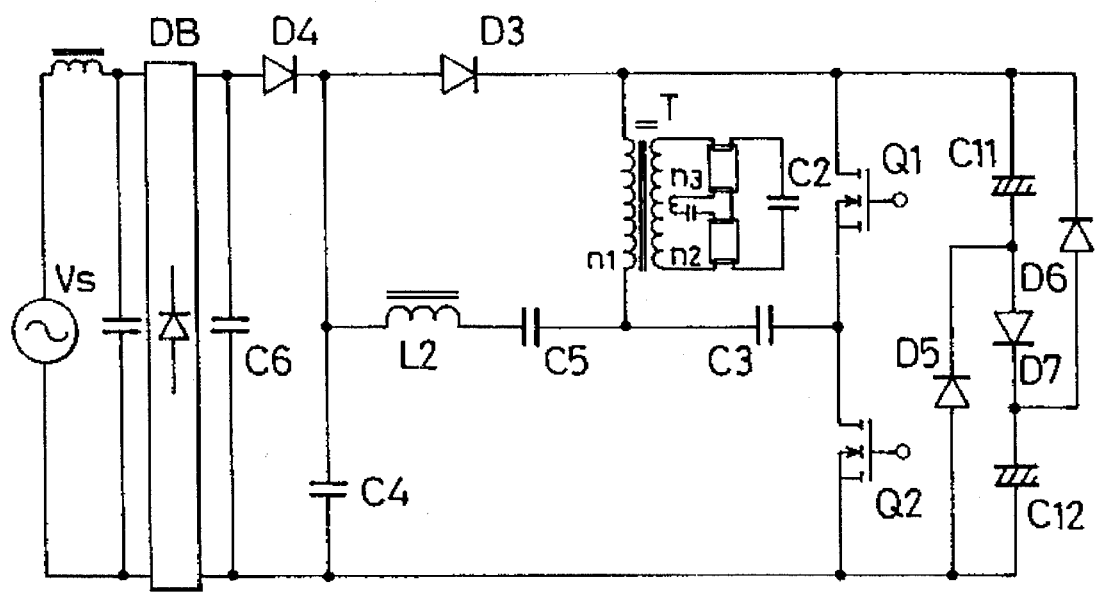

In another embodiment of the present invention as shown in FIG. 26, it is possible to adopt the leakage transformer arrangement and the arrangement of the partial smoothing power source.

In the foregoing embodiments of FIGS. 21–26, other arrangement than those already referred to are the same as those in the embodiment of FIG. 16 or 20, and the same effect can be realized.

Figure 27:
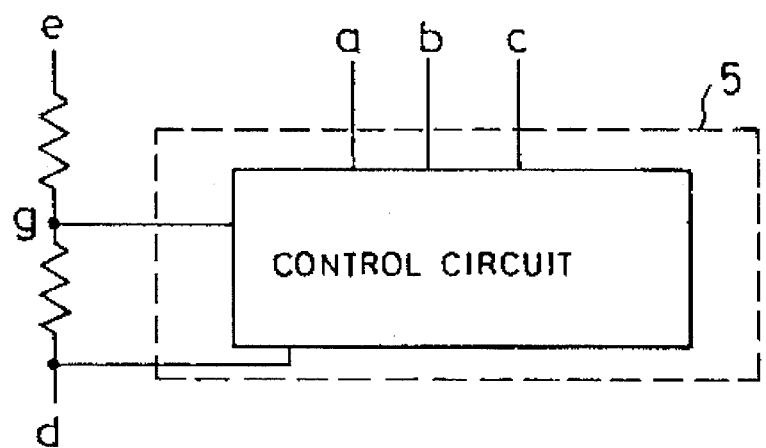
FIG. 27 is a partial circuit diagram at a major portion in another embodiment of the present invention.

In another embodiment of the present invention a major portion of the power source device of which is shown in FIG. 27, a control circuit 5 for controlling the switching frequency of the switching element Q1 and Q2 from the preheating to the lighting is added to the device of the embodiment in FIGS. 16 and 20. In FIG. 27, terminals a and b are connected respectively to gate and source electrodes of MOSFET employed as the switching element Q1, and terminals c and d are connected respectively to gate and source electrodes of further MOSFET employed as the switching element Q2. Further, a terminal e is connected to a positive pole side of the DC output terminals of the full-wave rectifier DB, and a terminal g is connected to a power source terminal Vcc of the control circuit 5.

Figure 28:
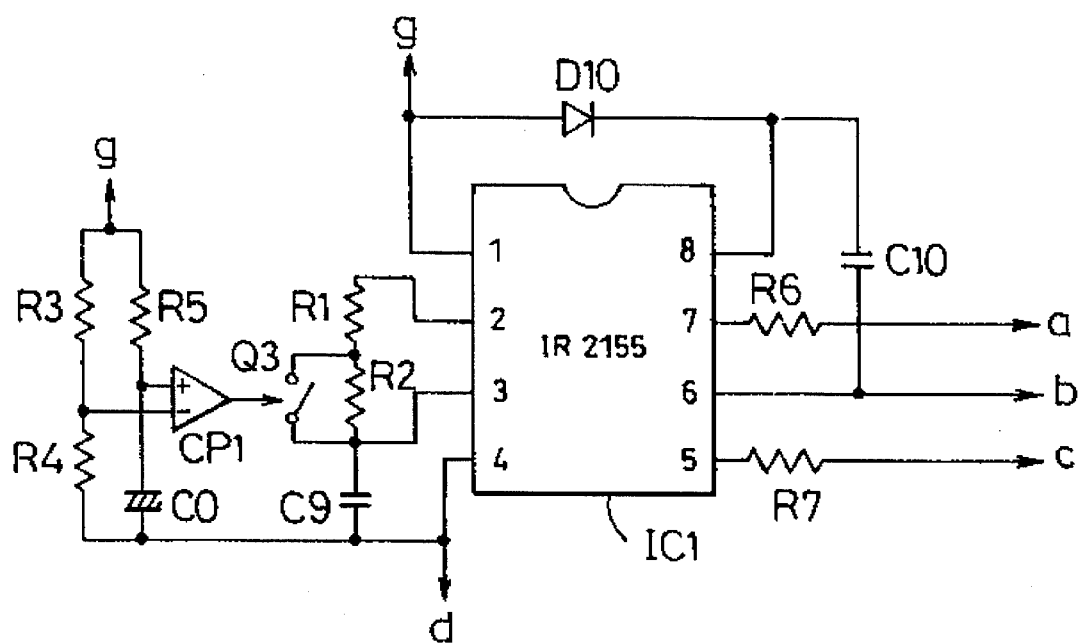
FIG. 28 is a more practical circuit diagram of the embodiment of FIG. 27.

A practical circuit example of the control circuit 5 in the embodiment of FIG. 27 is shown in FIG. 28, in which an IC made driver IC1 (known under IR2155) incorporating an oscillator is employed, and the arrangement is so made that its oscillating frequency is determined by time constant determined by resistors R1 and R2 and capacitor C9. Further, a bidirectional switching element Q3 is connected in parallel to the resistor R2, and the switching element Q3 is controlled by an output of a comparator CP1, to vary the time constant of the oscillator.

A control system of this embodiment is referred to next. In an event when the discharge lamp LA as the load is in lit state, as shown in FIG. 17, the switching elements Q1 and Q2 are operated to be ON and OFF at such frequency f2 that a lagging phase is attained with respect to the inverter circuit 2a but an advancing phase is given with respect to the input distortion improving circuit 3a. That is, in the arrangement of FIG. 28, the bidirectional switching element Q3 is in OFF state, and the oscillating frequency can be determined by the time constants of the resistors R1 and R2 and capacitor 9.

Next, references shall be made in the followings to an event where the load discharge lamp LA is in the preheating state. In the preheating, the bidirectional switching element Q3 is made ON by the output signal of the comparator CP1 of FIG. 28, so that the oscillating frequency is determined by-the time constant of the resistor R1 and capacitor C9. Here, in the event where the oscillating frequency f1 upon the preheating is within such range of, for example, fO2<f1<fO1 with respect to a resonance frequency fO1 of the input distortion improving circuit 3a and a resonance frequency fO2 of the inverter circuit 2a, there arises a risk resulting in a damage of the circuit that the lagging phase current of the inverter circuit 2a is made small whereas the advancing phase current of the input distortion improving circuit 3a is made large, and the switching elements Q1 and Q2 are made simultaneously ON. Therefore, the oscillation frequency f1 upon the preheating is set to be within such range with respect to either one of the inverter circuit 2a and input distortion improving circuit 3a as fO2<f1 and fO1<f1, and the switching elements Q1 and Q2 are prevented from turning simultaneously ON. In the present embodiment, further, the change-over of the frequency from the preheating state to the lighting state is discontinuously performed by the bidirectional switching element Q3, so that the resonance point fO1 of the input distortion improving circuit 3a will not be passed and there will be given no such stress that may result in destruction of the switching elements Q1 and Q2, whereby a stable lighting from the preheating state is made possible.

Figure 29:
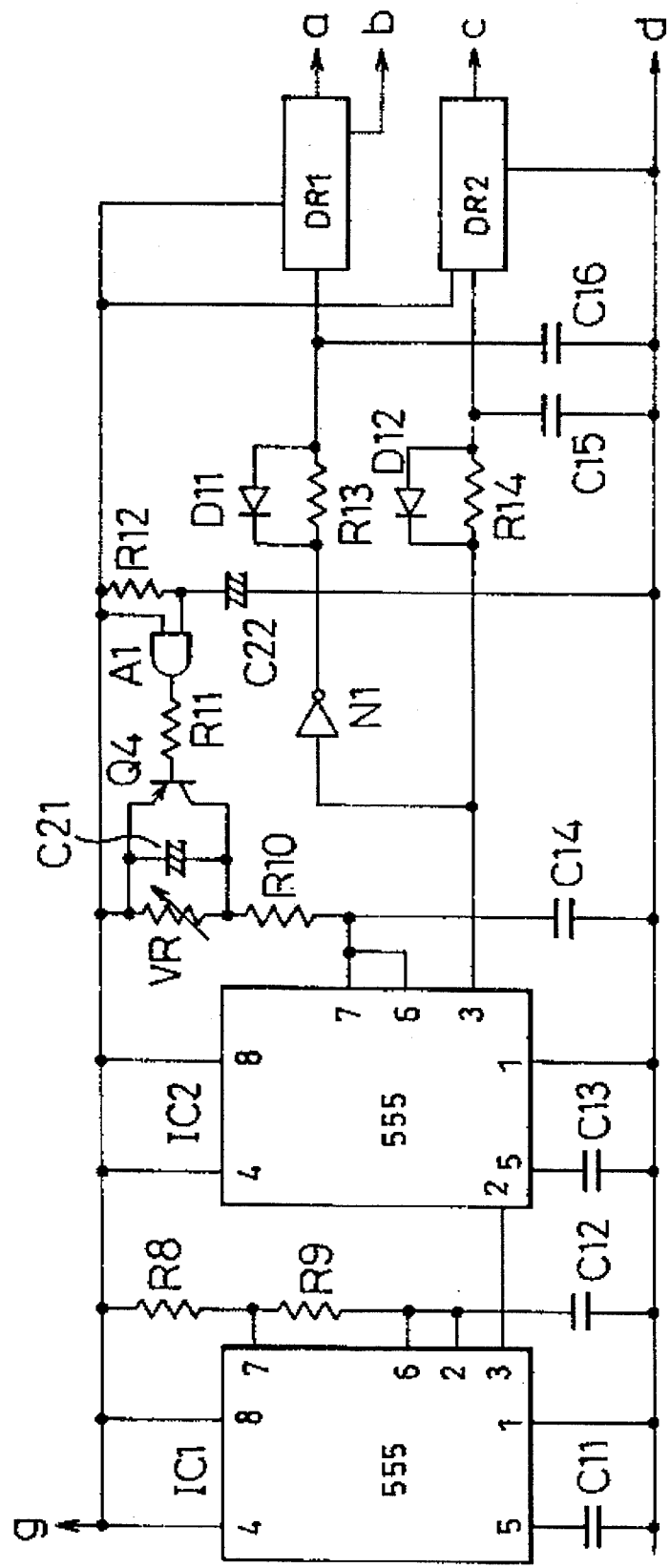
FIGS. 29 and 30 are circuit diagrams showing respectively other embodiments of the present invention.

In another embodiment of the present invention as shown in FIG. 29, the control circuit 5 is provided for rendering the duty ratio of the switching elements Q1 and Q2 to be variable in order to execute the control of the preheating state, lighting state and dimming state in an event when, for example, the load is the discharge lamp. In the present embodiment, a timer circuit consisting of a universal timer IC (for example, uPD5555 manufactured by a Japanese firm known as NEC) is employed, so that the oscillation frequency will be determined at a timer circuit IC1, then the duty ratio is determined by a timer circuit IC2, thus obtained signals are frequency-divided and, after formation of a dead-off time, supplied to respective driving circuits DR1 and DR2.

The control system of the present embodiment shall be referred to in the followings. First, in the preheating state of such load LA as the discharge lamp, an output of a logical circuit A1 is made to be at Low level, and the switching element Q4 is made ON so that signals different in the duty ratio are input into the driving circuits DR1 and DR2. Thereafter, the potential of the capacitor C22 gradually rises, the switching element Q4 turns to OFF state, and the duty ratio of the driving signals to the switching elements Q1 and Q2 will be substantially 50%. That is, the driving signals upon the preheating are made closer from an unbalanced state to the state of 50%, even though the oscillation frequency is kept constant. Since there occurs no variation in the oscillation frequency of the switching elements Q1 and Q2 in these steps, the stable lighting from the preheating state is made possible while preventing the switching elements Q1 and Q2 from turning simultaneously ON.

In carrying out the dimming control, further, it suffices the purpose to vary the duty ratio of the driving signals to the switching elements Q1 and Q2 by varying the value of a variable resistor VR in FIG. 29. While in this embodiment a separately-excited system is employed as the control system, the foregoing control is made possible even when a self-excited system is employed, in which a fall of the voltage at the switching element Q2 on low potential side is detected to provide to the switching element Q2 an ON signal.

Figure 30:
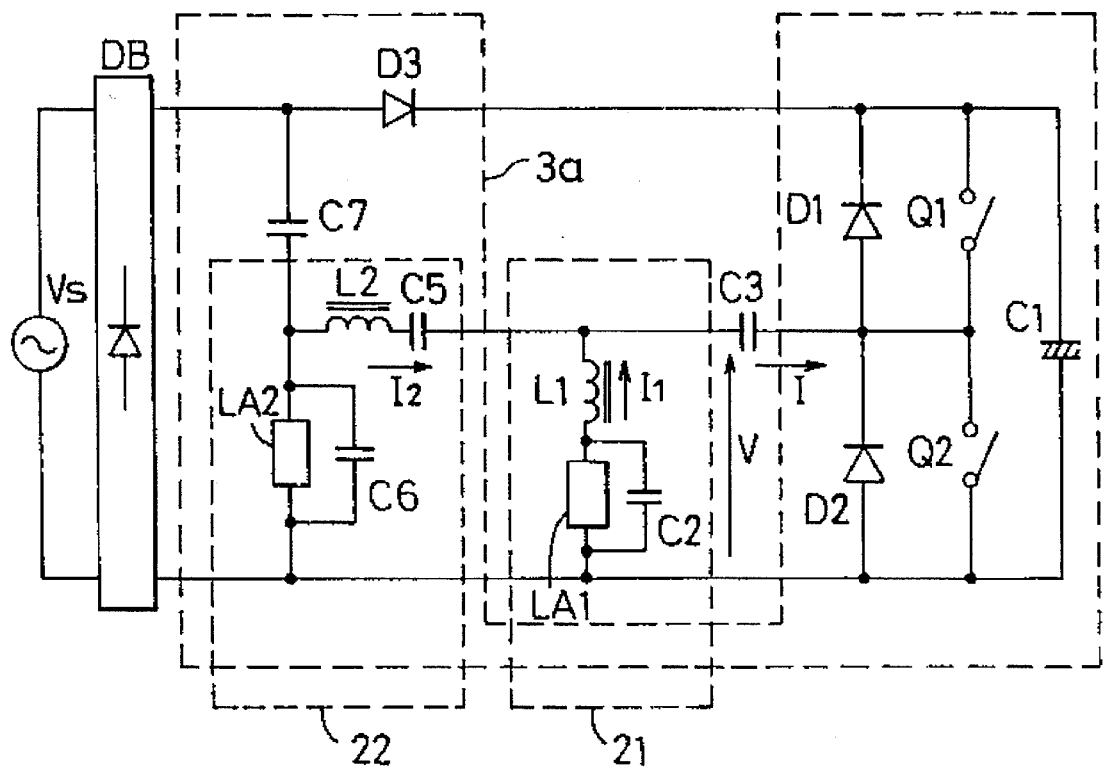

In another embodiment of the present invention as shown in FIG. 30, the arrangement is so made that the input distortion improving circuit 3a functions also as the inverter load circuit 1, and a phase correction is carried out in the inverter load circuit 1. In this embodiment, the commercial AC power source Vs is connected to the AC input terminals of the full-wave rectifier DB, and, across the DC output terminals of this full-wave rectifier DB, the source power smoothing capacitor C1 and a series circuit of the switching elements Q1 and Q2 are connected in parallel through the diode D3. To the respective switching elements Q1 and Q2, each of the diodes D1 and D2 is connected in inverse parallel relationship. Further across the DC output terminals of the full-wave rectifier DB, a parallel circuit of a capacitor C6 and a load LA2 is connected through a capacitor C7. Between a mutual connecting point of the capacitors C6 and C7 and another mutual connecting point of the switching elements Q1 and Q2, the capacitors C5 and C3 are connected in series through the inductor L2. To a connecting point between the capacitors C5 and C3, an end of a parallel circuit of the capacitor C2 and load LA1 is connected through the inductor L1 and the other end of this parallel circuit is connected to the negative side output terminal of the full-wave rectifier DB.

References shall be made to the operation of the embodiment of FIG. 30 in the followings. In this embodiment, the switching elements Q1 and Q2 are alternately made ON and OFF, so as to operate as a half-bridge type inverter with the charged voltage of the smoothing capacitor C1 utilized as the power source, and a high frequency power is supplied to the loads LA1 and LA2. That is, as the switching element Q1 is turned ON, a current is caused to flow through a path of the capacitor C1, switching element Q1, capacitor C3, inductor L1, parallel circuit of the load LA1 and capacitor C2, and capacitor C1 and, on the other hand, a further current is caused to flow through a path of the capacitor C1, switching element Q1, capacitors C3 and C5, inductor L2, parallel circuit of the load LA2 and capacitor C6, and capacitor C1.

When the switching element Q2 is turned ON, a current is caused to flow through a path of the capacitor C3, switching element Q2, parallel circuit of the load LA1 and capacitor C2, inductor L1 and capacitor C3, and a further current is caused to flow through a path of the capacitor C3, switching elements Q2, parallel circuit of the load LA2 and capacitor C6, inductor L2, and capacitors C5 and C3, whereby the high frequency powers at switching frequency of the switching elements Q1 and Q2 are supplied to the loads LA1 and LA2.

While in the load circuit 21 the inductor L1 and capacitor C2 are forming an LC series resonance system here, the current flowing through this resonance system is made to be at a lagging phase with respect to the rectangular wave voltage V supplied from the smoothing capacitor C1 through the switching elements Q1 and Q2. On the other hand, the capacitor C6, inductor L2 and capacitor C5 in the load circuit 22 and the capacitor C7, inductor L2 and capacitor C5 in the input distortion compensating circuit 3a are respectively forming an LC series resonance system, and the current I2 flowing through these resonance systems will be in the advancing phase with respect to the rectangular wave voltage V as will be explained later. Thus, as has been also described in the circuitry operational explanation of the foregoing input distortion improving circuit 3a, the composite current I of the lagging phase current I1 and advancing phase current I2 can be reduced in accordance with the phase difference between both currents I1 and I2.

In the present embodiment, it is made possible to reduce the composite current I of the lagging phase current I1 and advancing phase current I2, by rendering the current I1 flowing through the load circuit 21 to be in the lagging phase and the current I2 flowing through the input distortion improving circuit 3a functioning also as the load circuit 22 to be in the advancing phase with respect to the rectangular wave voltage V prepared by the switching elements Q1 and Q2, whereby the power can be supplied without increasing the currents flowing to the switching elements Q1 and Q2 notwithstanding the provision of the two loads, so that a switching element of small current capacity can be used, and an effect of reducing costs can be realized. Further, with the input distortion improving circuit 3a made to function also as the current compensating circuit 2 and inverter load circuit 1, the entire circuit arrangement is made simpler, and it is made possible to minimize the size of the circuit and to reduce required costs.

Figure 31:
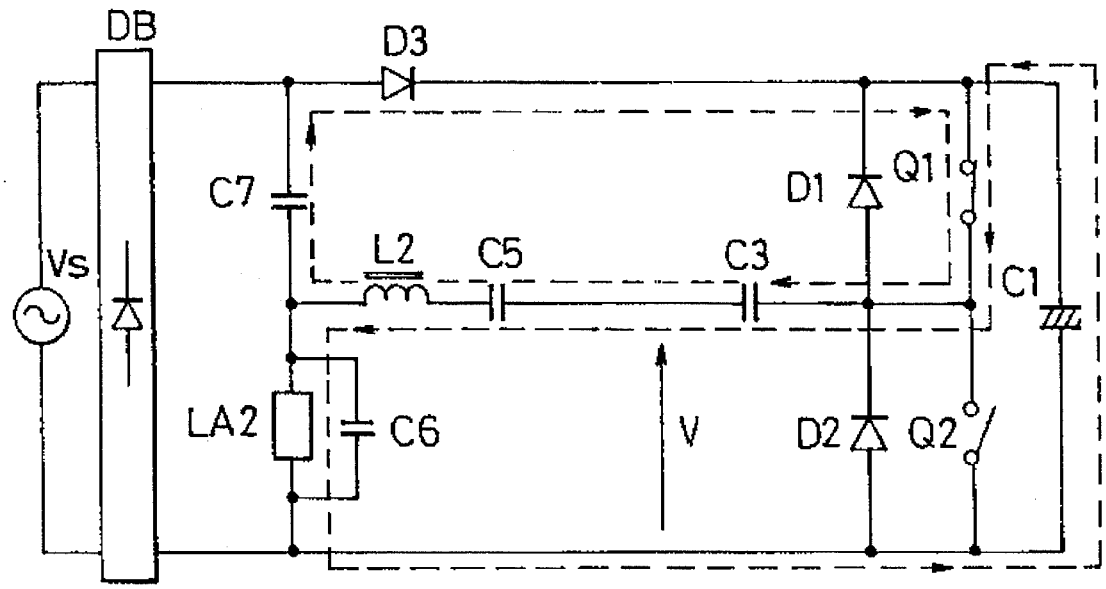
FIGS. 31 through 36 are respectively explanatory views for different operating states in the embodiment of FIG. 30.

In FIG. 31 and following drawings, the operation of the input distortion improving circuit 3a in the present invention shall be described. In the circuit 3a, the inductor L2 and capacitor C5 are added to the arrangement for improving the input current distortion by means of the diode D3 and capacitor C7, so as to concurrently have the function of charging the smoothing capacitor C1. Further, a load circuit comprising the load LA and capacitor C6 is provided between a connecting point of the capacitor C7 to the inductor L2 and the DC output end of the full-wave rectifier DB, so as to also have the load function. Further the current flowing through the series resonance system including the capacitor 7, inductor L2 and capacitor C5 is made to be in advancing phase with respect to the rectangular wave voltage V supplied from the smoothing capacitor C1 and through the switching elements Q1 and Q2.

The operation of the circuit of FIG. 31 shall be explained in the followings. First, as the switching element Q1 turns ON, a current is caused to flow through a path of the capacitor C1, switching element Q1, capacitors C3 and C5, inductor L2, parallel circuit of the load LA2 and capacitor C6 and capacitor C1 as well as a path of the capacitor C7, diode D3, switching element Q1, capacitor C3, capacitor C5, inductor L2 and capacitor C7. This current flows as an advancing phase current.

Figure 32:
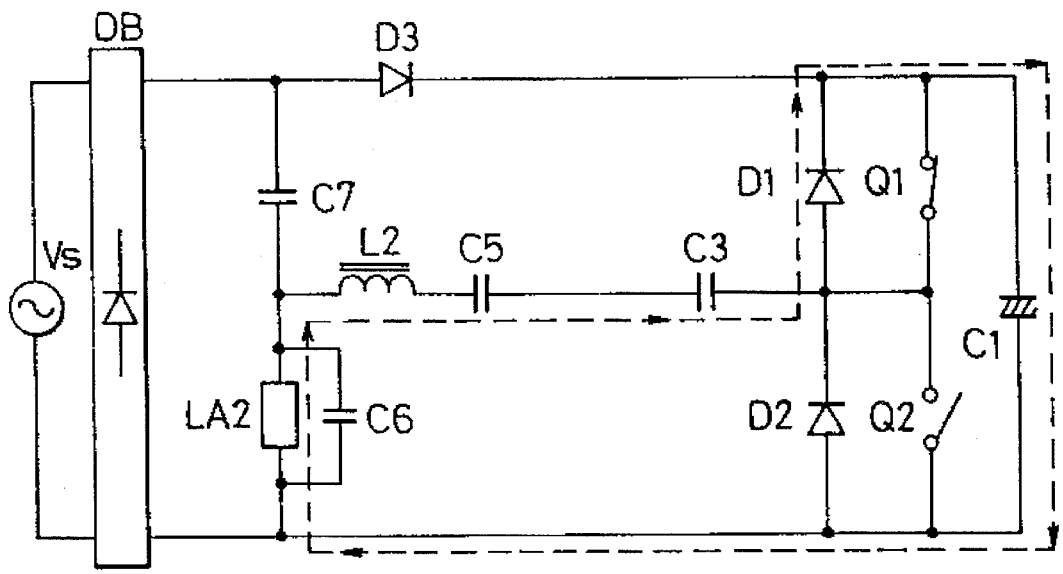

Next, as shown in FIG. 32, the direction of the current is inverted in the same period of ON of the switching element Q1, and the current flows through a path of the inductor L2, capacitor C5 and C3, diode D1, capacitor C1, parallel circuit of the load LA2 and capacitor C6, and inductor L2.

Figure 33:
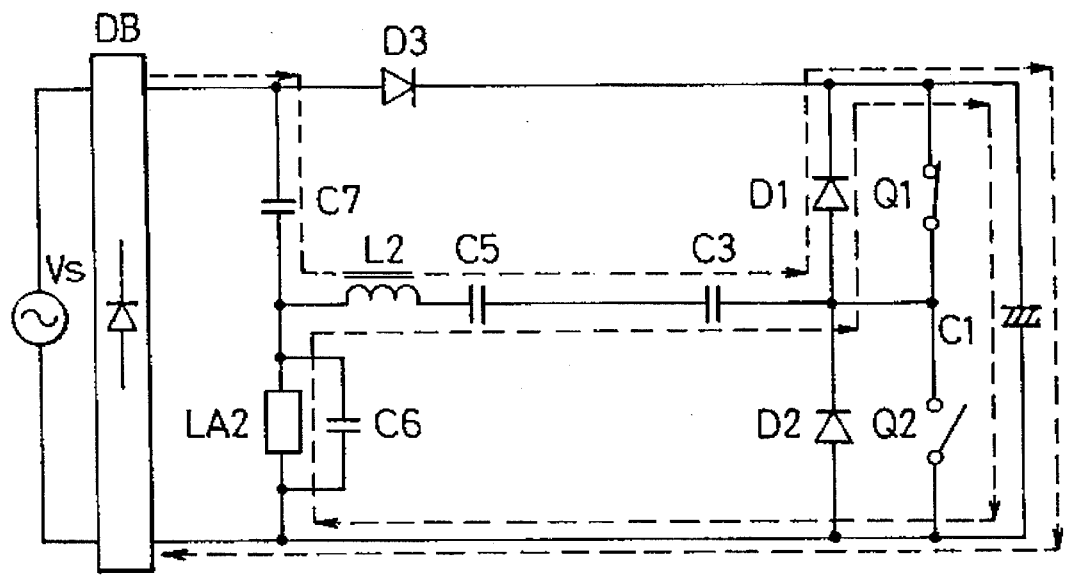

Also in the same period of ON of the switching element Q1, next, the current flows as shown in FIG. 33 through the path of the inductor L2, capacitors C5 and C3, diode D1, capacitor C1, parallel circuit of the load LA2 and capacitor C6, and inductor L2 and, thereafter, at the time when the potential at the connecting point between the capacitor C7 and the inductor L2 drops and a voltage of a series circuit of the capacitors C7 and C6 falls below a voltage across the DC output terminals of the full-wave rectifier DB, a current is caused to flow through a path of the rectifier DB, capacitor C7, inductor L2, capacitors C5 and C3, diode D1, capacitor C1 and rectifier DB.

Figure 34:
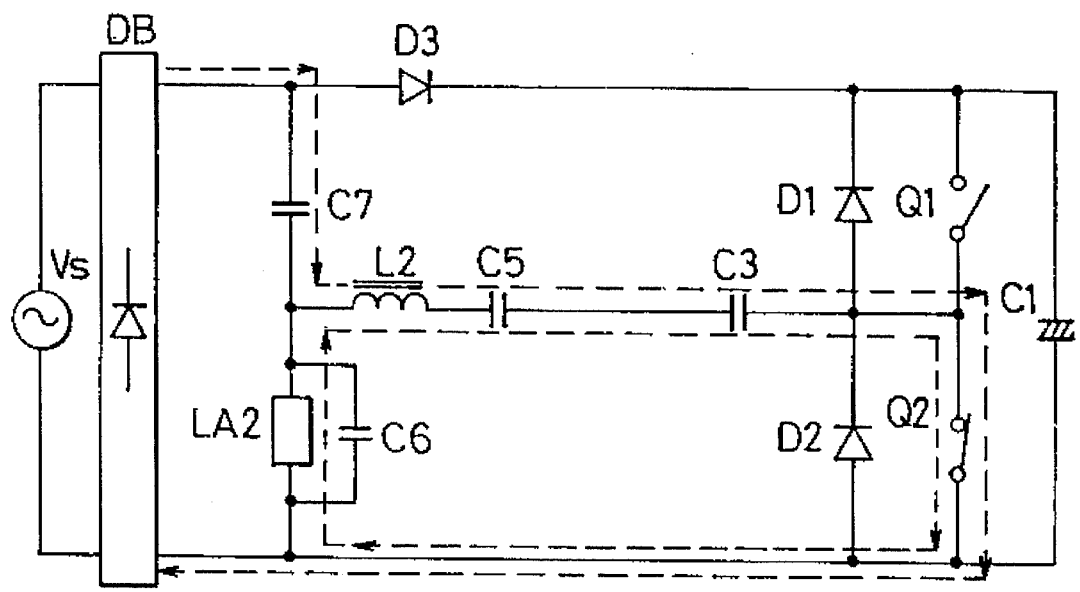

As the switching element Q2 turns ON next, the current flows, as shown in FIG. 34, through a path of the full-wave rectifier DB, capacitor C7, inductor L2, capacitors C5 and C3, switching element Q2 and full-wave rectifier DB, and a path of the inductor L2, capacitors C5 and C3, switching element Q2, parallel circuit of the load LA2 and capacitor C6, and inductor L2.

Figure 35:
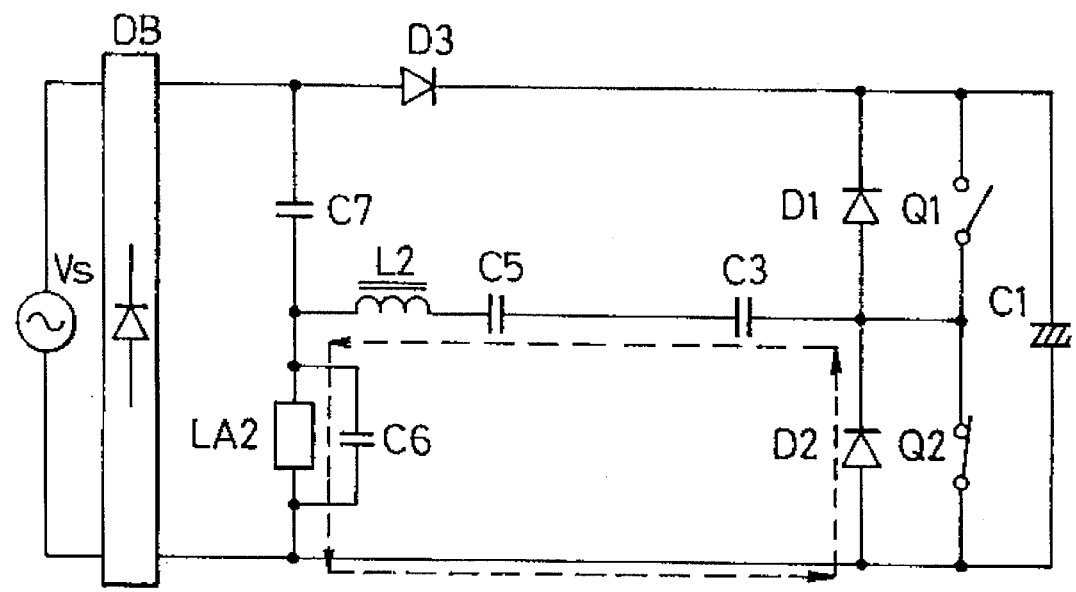

Also in the same period of ON of the switching element Q2, next, the direction of the current is inverted and, as shown in FIG. 35, the current flows through a path of the inductor L2, parallel circuit of the load LA2 and capacitor C6, diode D2, capacitors C3 and C5 and inductor L2.

Figure 36:
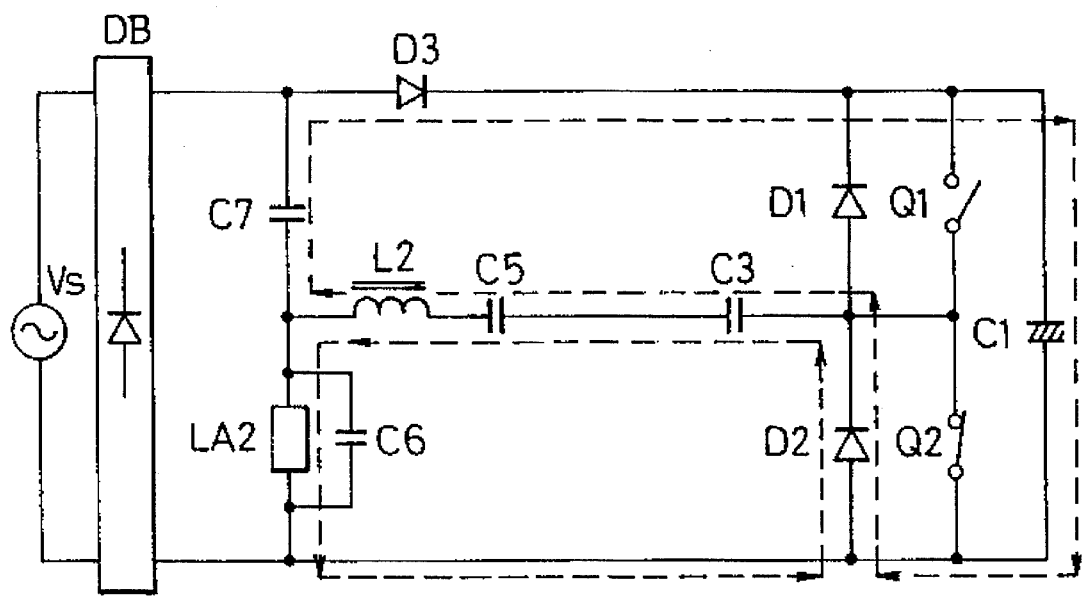

Also in the same period of ON of the switching element Q2, as shown in FIG. 36, the current flows through a path of the inductor L2, parallel circuit of the load LA2 and capacitor C6, diode D2, capacitors C3 and C5, and inductor L2 and, thereafter, at the time when the potential at the connecting point of the capacitor C7 to the inductor L2 rises and the voltage at the series circuit of the capacitors C7 and C6 exceeds the voltage at the capacitor C1, a current is caused to flow through a path of the inductor L2, capacitor C7, diode D3, capacitor C1, diode D2, capacitors C3 and C5 and inductor L2. With the above circuit operation, the smoothing capacitor C1 repeats the charge and discharge operation and is capable of improving any input current distortion and supplying the power to the load LA2.

Figure 37:
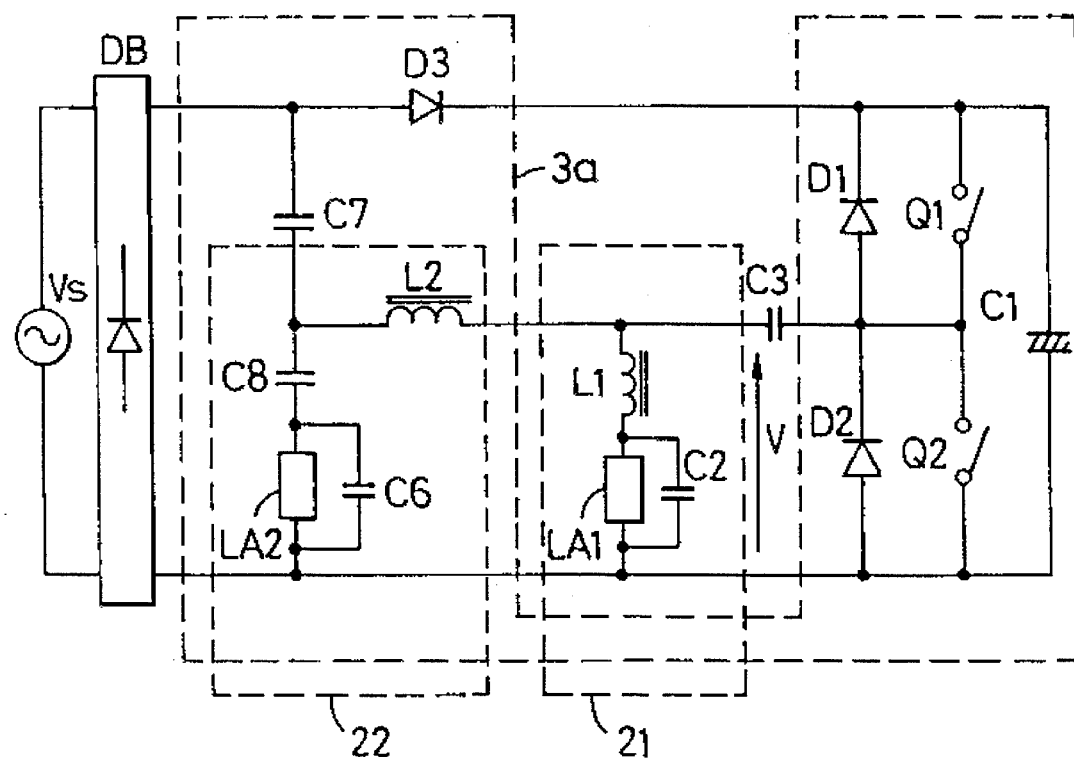
FIGS. 37 through 46 are circuit diagrams showing respectively different, other-embodiments of the present invention.

In another embodiment of the present invention in FIG. 37, the capacitor C5 in the embodiment of FIG. 30 is removed and, instead, a capacitor C8 is connected in series to the parallel circuit of the load LA2 and capacitor C6. Other arrangement and effect of the present embodiment are the same as those in the foregoing embodiment of FIG. 30.

Figure 38:
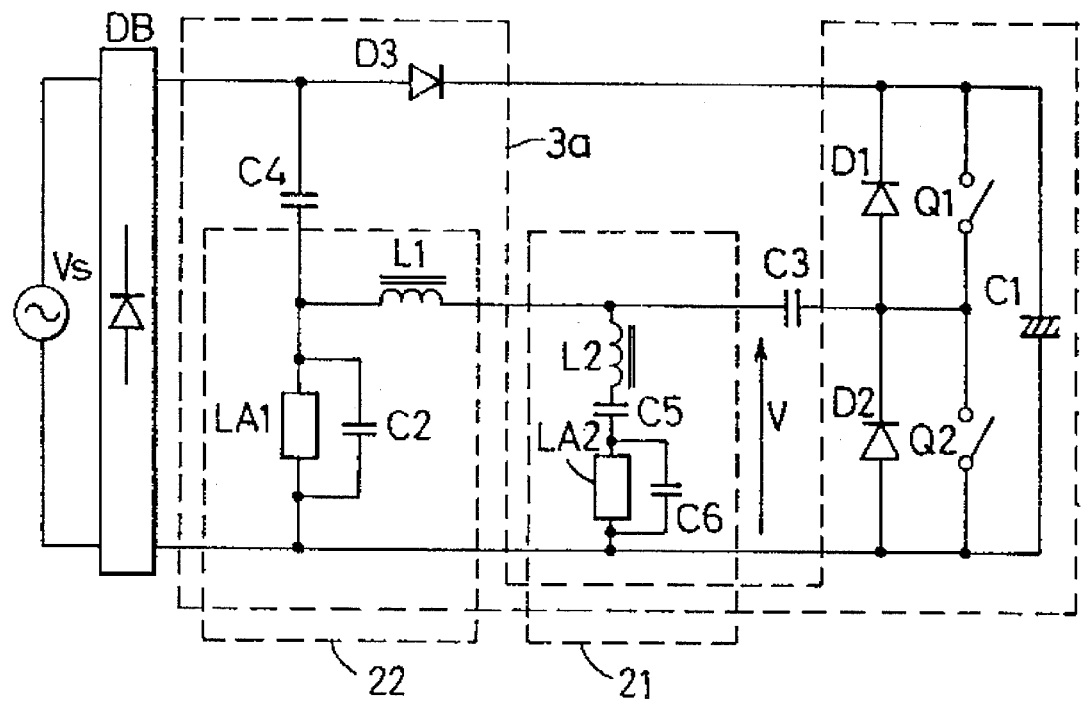

In another embodiment of the present invention in FIG. 38, in contrast to the foregoing embodiment of FIG. 30 where the arrangement is so made that the current of the lagging phase is made to flow to the load circuit 21 with respect to the rectangular wave voltage V while the current of advancing phase is made to flow to the circuit concurrently functioning as the input distortion improving circuit 3a and load circuit 22, the arrangement is so made that the phase relationship of the currents is reversed. That is, in the present embodiment, the current of lagging phase is made to flow to the circuit functioning concurrently as the input distortion improving circuit 3a and load circuit 22 and the current of advancing phase is made to flow to the load circuit 21. Other operation and effect of this embodiment are the same as those in the embodiment of FIG. 30. It will be appreciated here that the capacitor C4 acts in the same manner as the capacitor C7 in the embodiment of FIG. 30.

Figure 39:
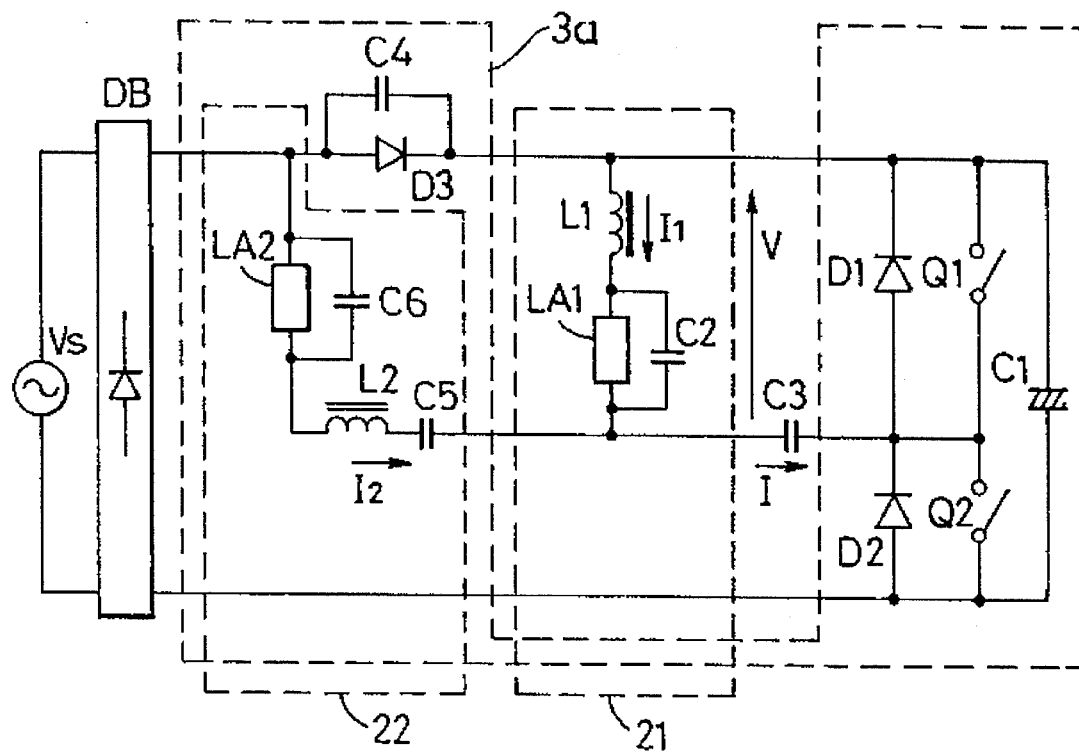

In another embodiment of the present invention as in FIG. 39, the circuit concurrently functioning as the input distortion improving circuit 3a and load circuit 22 and the other load circuit 21 are so arranged as to correct the current phase. That is, in the present embodiment, while its circuit arrangement is different from the embodiment of FIG. 30, the circuit operation is capable of reducing the composite current I of the currents I1 and I2 by correcting the phase with the current I2 flowing to the circuit functioning as both of the input distortion improving circuit 3a and load circuit 22 made to be at the advancing phase with respect to the rectangular wave voltage V and with the current I1 flowing to the load circuit 21 made to be at lagging phase, and, in this respect, the arrangement is the same as the embodiment of FIG. 30. In respect of the improvement of the input current distortion, too, the same can be performed by charging and discharging operation of the capacitor C4, and the same effect as in the embodiment of FIG. 30 can be realized.

Figure 40:
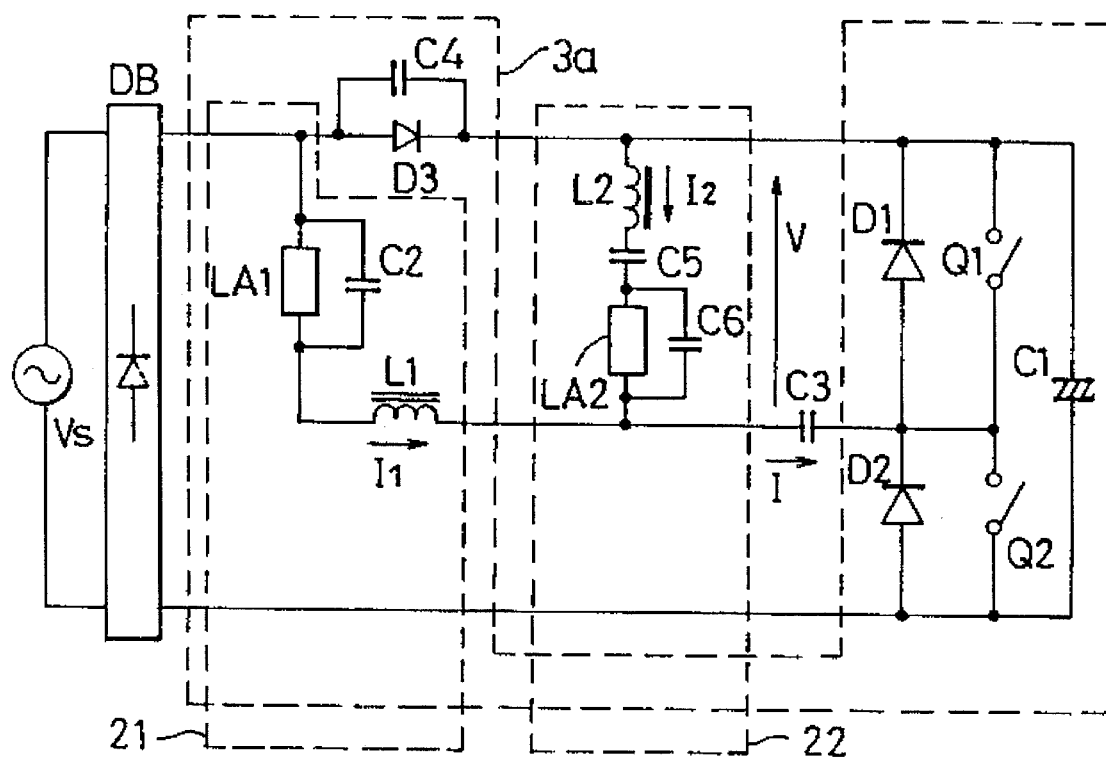

In another embodiment of the present invention as in FIG. 40, in contrast to the foregoing embodiment of FIG. 39 where the current I1 flowing to the load circuit 21 is made to be in the lagging phase with respect to the rectangular wave voltage V and the current I2 flowing to the circuit functioning as both of the input distortion improving circuit 3a and load circuit 22 is made to be in the advancing phase, the phase relationship is reversed in the present embodiment. That is, in the present embodiment, the current I1 of the lagging phase is made to flow to the circuit functioning as both of the input distortion improving circuit 3a and load circuit 21 whereas the current I2 of the advancing phase is made to flow to the load circuit 22. Other arrangement is the same as that in the embodiment of FIG. 39, and the same effect can be realized.

Figure 41:
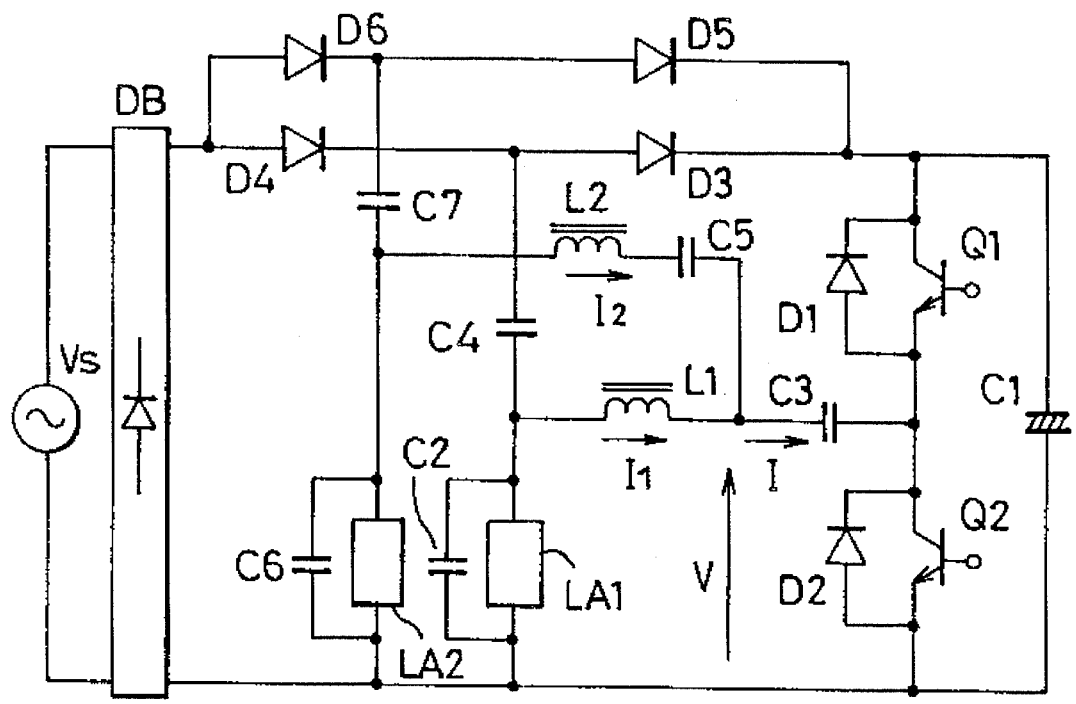

In another embodiment of the present invention as shown in FIG. 41, two sets of the circuit concurrently functioning as the input distortion improving circuit and the inverter load circuit are provided and arranged for deviating the phase of the currents, whereby the respective circuits constitute mutual current compensating circuits, which employ in common the switching elements Q1 and Q2, diodes D1 and D2 and DC component cutting capacitor C3 and provided for receiving the rectangular wave voltage V supplied at one end. One of the current compensating circuit comprises the inverter load circuit 1 including the inductor L1, capacitor C2 and load LA1, and the input distortion improving circuit 3a including the diode D3, capacitor C4 and inductor L1, the inductor L1 being thus employed concurrently by both circuits, and the current I1 comprising the current of the inverter load circuit 1 on which the current of the input distortion improving circuit 3a is superposed is made to flow. The other current compensating circuit 2 is formed by the inverter load circuit 1 comprising the inductor L2, capacitors C5 and C6 and load LA2 and the input distortion improving circuit 3a comprising the diode D5, capacitor C7 and inductor L2. The inductor L2 is used by both circuits in common, and the current I2 on which the currents of the inverter load circuit 1 and input distortion improving circuit 3a are superposed is made to flow through the inductor L2. With these currents I1 and I2 set to have respectively different phases with respect to the rectangular wave voltage V, the composite current I is made smaller, and the two circuits can be operated with the current required substantially for one circuit.

Since in the present embodiment two of the current compensating circuits employing part of each of the input distortion improving circuit 3a and inverter load circuit 1 in common are provided for flowing the currents mutually different in the phase, it is not required to provide the current compensating circuit separately. Further, since the two current compensating circuits respectively act also as the input distortion improving circuit 3a, that is, as a charging circuit, it is not required to have a power for two loads supplied by the single charging circuit, and the entire circuit can be easily designed.

Figure 42:
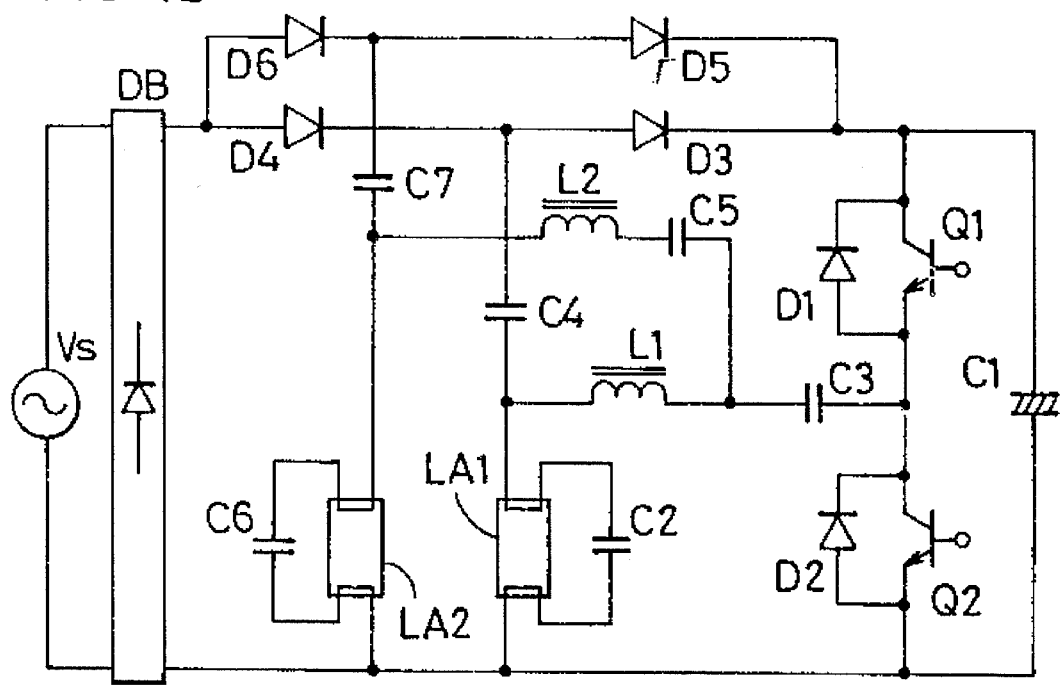

In another embodiment of the present invention as shown in FIG. 42, the device is arranged as the power source device for the discharge lamp employed as the load, in which the capacitors C2 and C6 connected to the non-source side terminals of the discharge lamps so as to function as the resonating capacitor and to constitute the filament heater circuit.

In the present embodiment, other arrangements than those described in the above are the same as those in the embodiment of FIG. 41, and the same effect can be obtained.

Figure 43:
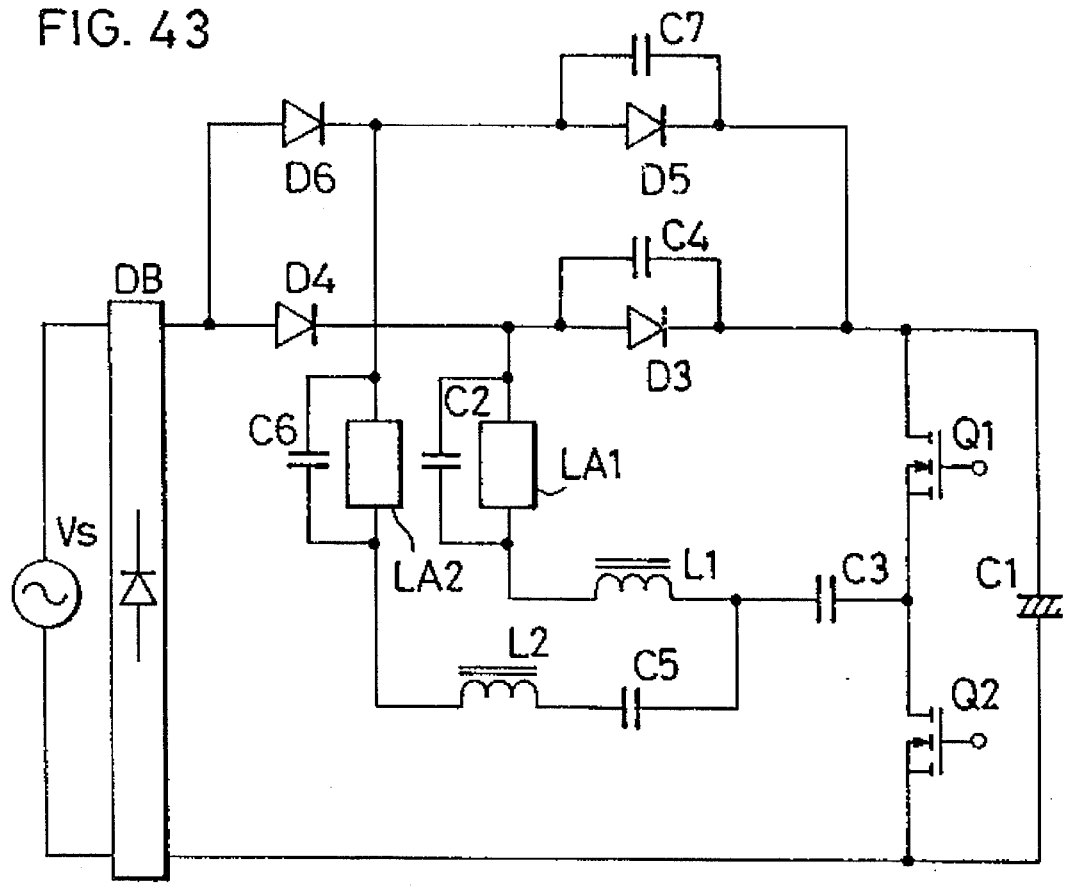

In another embodiment of the present invention as shown in FIG. 43, the diode D3 and capacitor C4 are added to the inverter load circuit 1 comprising the inductor L1, capacitor C2 and load LA1, and the diode D5 and capacitor C7 are added to the inverter load circuit 1 comprising the inductor L2, capacitors C5 and C6 and load LA2, and the inverter load circuit 1 acts also as the input distortion improving circuit 3a. In the present instance, the intention to reduce the composite current I by means of deviation in the phase of the respective currents is the same as the foregoing embodiment of FIG. 41, and the same result can be realized.

Figure 44:
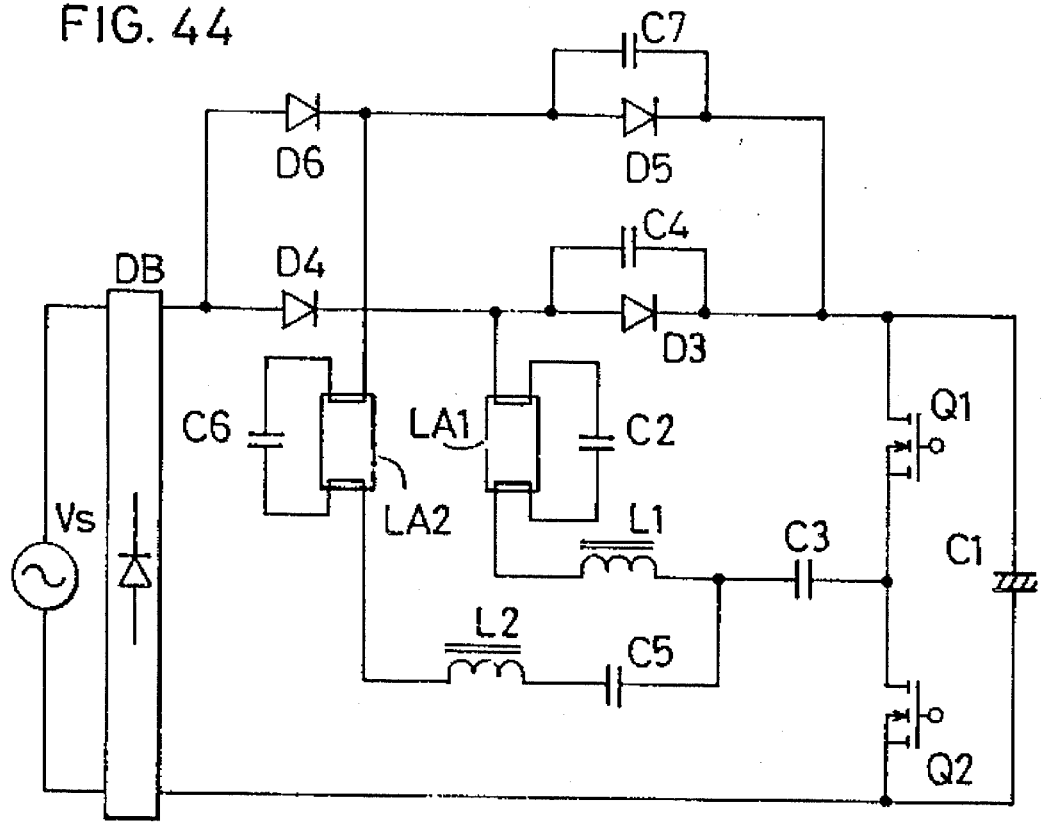

In another embodiment of the present invention as in FIG. 44, the device is arranged for use as an inverter for the discharge lamp employed as the load, in which the capacitors C2 and C6 are respectively connected to the non-source side terminals of each of the discharge lamps to function as the resonating capacitor and also as the filament heating circuit. Other arrangement than those described above are the same as those in the embodiment of FIG. 43, and the same effect can be obtained.

Figure 45:
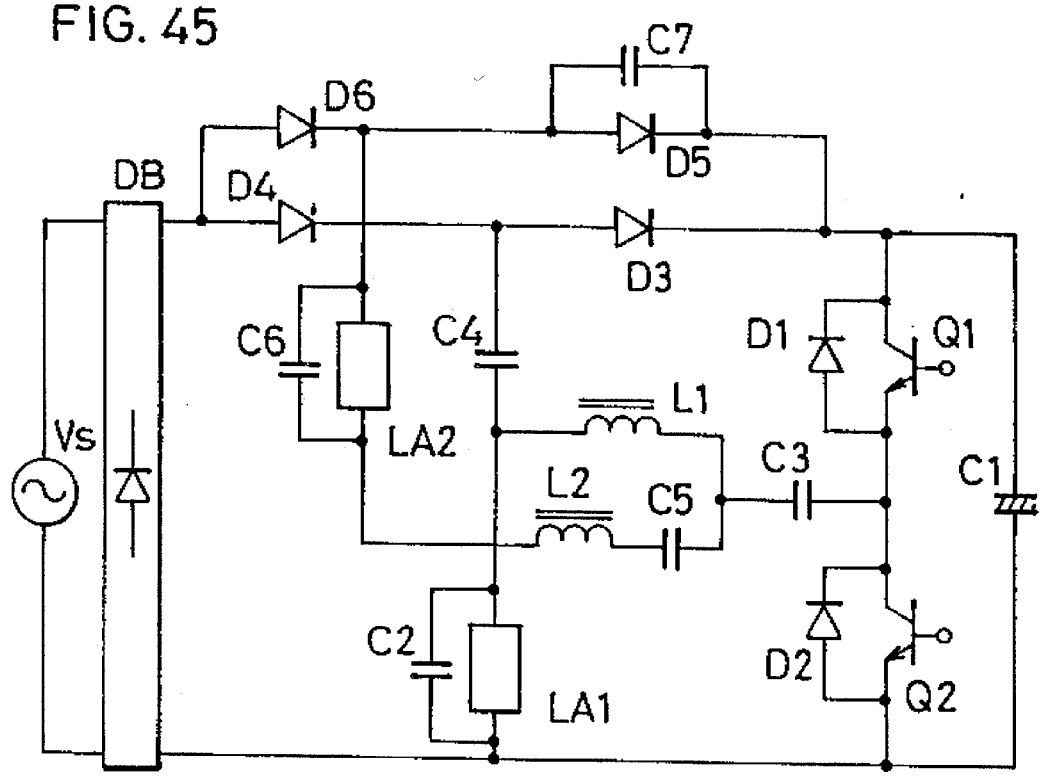
Figure 46:
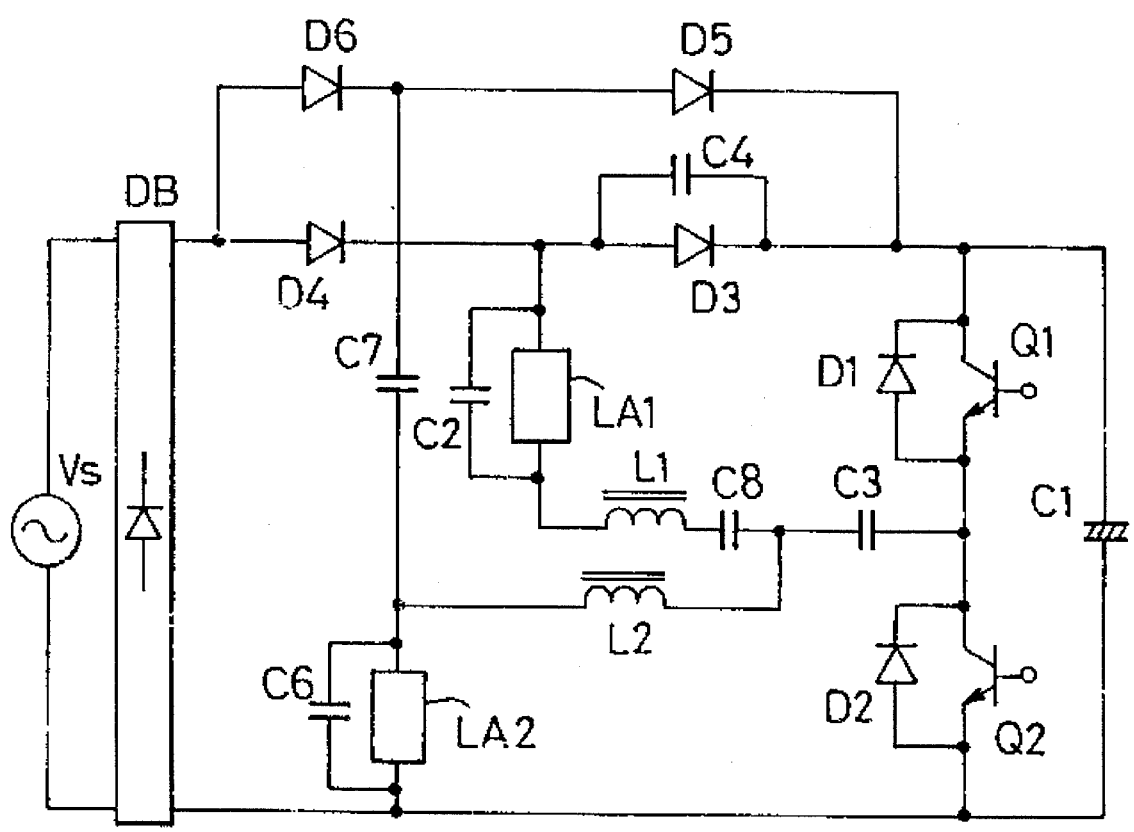

In other embodiments of the present invention as shown respectively in each of FIGS. 45 and 46, the device is arranged with one of the input distortion improving circuits as in the embodiments of FIGS. 42 and 43. Other arrangements and effect are the same as those in the embodiments of FIGS. 42 and 43.

What is claimed is:

1. A power source device comprising:

a direct current (DC) power source receiving an alternating current (AC) power signal, rectifying and smoothing the AC power signal, and outputting a DC power signal;

an inverter circuit including a plurality of switching elements for receiving the DC power signal and for converting the DC power signal into arc rectangular wave high frequency voltage by turning ON and OFF the switching elements at a high frequency;

a first inverter load circuit receiving the rectangular wave high frequency voltage wherein a first current having a first phase flows to the first inverter load circuit;

a current compensating circuit connected in parallel to the first inverter load circuit for conducting, through the current compensating circuit, a second current having a second phase substantially anti-phase with respect to the first phase; and means for obtaining a composite current of the first current to the first inverter load circuit and the second current to the current compensating circuit slightly lagging in phase with respect to the high frequency voltage, and for shifting the first current to the first inverter load circuit to a lagging phase and the second current to the current compensating circuit to an advancing phase with respect to the high frequency voltage.

2. A power source device comprising:

a direct current (DC) power source receiving an alternating current (AC) power signal, rectifying and smoothing the AC power signal, and outputting a DC power signal;

an inverter circuit including a plurality of switching elements for receiving the DC power signal and for converting the DC power signal into a rectangular wave high frequency voltage by turning ON and OFF the switching elements at a high frequency;

a first inverter load circuit receiving the rectangular wave high frequency voltage wherein a first current having a first phase flows to the first inverter load circuit;

a current compensating circuit connected in parallel to the first inverter load circuit for conducting, through the current compensating circuit, a second current having a second phase substantially anti-phase with respect to the first phase; and means for obtaining a composite current of the first current to the first inverter load circuit and the second current to the current compensating circuit at a slightly lagging phase with respect to the high frequency voltage, and for shifting the first current to the first inverter load circuit to an advancing phase and the second current to the current compensating circuit to a lagging phase with respect to the high frequency voltage.

3. A power source device comprising:

a direct current (DC) power source receiving an alternating current (AC) power signal, rectifying and smoothing the AC power signal, and outputting a DC power signal;

an inverter circuit including a plurality of switching elements for receiving the DC power signal and for converting the DC power signal into a rectangular wave high frequency voltage by turning ON and OFF the switching elements at a high frequency;

a first inverter load circuit receiving the rectangular wave high frequency voltage wherein a first current having a first phase flows to the first inverter load circuit;

a current compensating circuit connected in parallel to the first inverter load circuit for conducting through the current compensating circuit a second current having a second phase substantially anti-phase with respect to the first phase;

means for obtaining a composite current of the first current to the first inverter load circuit and the second current to the current compensating circuit at a slightly lagging phase with respect to the high frequency voltage;

a second inverter load circuit connected to the current compensating circuit; and means connected to the first and second inverter load circuits for making the first current to the first inverter load circuit and a third current to the second inverter load circuit mutually anti-phase.

4. A power source device comprising:

an input distortion reducing circuit including a smoothing capacitor and switching elements for receiving an AC input current, for chopping the AC input current by alternately turning the switching elements ON and OFF at a high frequency, for reducing any distortion of the input current, and for generating a DC voltage across the smoothing capacitor;

a first inverter circuit coupled to the input distortion improving circuit for generating a rectangular wave high frequency voltage from the DC voltage;

a load circuit coupled to the first inverter circuit for receiving the rectangular wave high frequency voltage;

means connected to the switching elements for commonly controlling the switching elements for chopping AC input current and for controlling the first inverter circuit; and a current compensating circuit for flowing to the switching elements a current substantially anti-phase with respect to at least one of a first current from the input distortion reducing circuit and a second current from the first inverter circuit wherein the input distortion reducing circuit also acts as the current compensating circuit by making the current flowing from the input distortion reducing circuit to the switching elements substantially anti-phase with respect to the current flowing from the first inverter circuit.

5. The device according to claim 4 wherein the input distortion reducing circuit includes a second load and also acts as a second inverter circuit.

6. The device according to claim 5 wherein the first inverter circuit includes means for reducing the distortion of the Ac input current by also acting as the input distortion reducing circuit.

7. A power source device comprising:

an input distortion reducing circuit including a smoothing capacitor and switching elements for receiving an AC input current, for chopping the Ac input current by alternately turning the switching elements ON and OFF at a high frequency, for reducing any distortion of the input current, and for generating a DC voltage across the smoothing capacitor;

a first inverter circuit coupled to the input distortion imposing circuit for generating a rectangular wave high frequency voltagel from the DC voltage;

a load circuit coupled to the first inverter circuit for receiving the rectangular wave high frequency voltage;

means connected to the switching elements for commonly controlling the switching elements for chopping the AC input current and for controlling the first inverter circuit;

a current compensating circuit for flowing to the switching elements a current substantially anti-phase with respect to at least one of a first current for the input distortion reducing circuit and a second current from the first inverter circuit;

a rectifier for full-wave rectifying the AC input current;

a forward direction diode connected at a first end to a first output end of the rectifier;

a smoothing capacitor connected between a second end of the diode and a second output end of the rectifier;

first and second switching elements connected in parallel to the smoothing capacitor;

a DC component blocking capacitor connected at a first end to a connecting point between the first and second switching elements;

an inverter load circuit, including a resonance circuit and a discharge lamp load, connected between a second end of the DC component blocking capacitor and the second end of the diode;

a series circuit of an inductor and a capacitor, the series circuit being connected between the second end of the DC component blocking capacitor and the first end of the diode;

a capacitor connected to the first and second output ends of and substantially in parallel with the rectifier; and control means for alternately driving ON and OFF the first and second switching elements when the discharge lamp load is lighted, at an oscillation frequency lower than a resonance frequency of the series circuit of the inductor and capacitor and higher than a resonance frequency of the inverter load circuit.

8. The device according to claim 7 wherein the control means comprises means for changing the oscillation frequency to a higher frequency than both the resonance frequency of the series circuit of the inductor and capacitor and the resonance frequency of the inverter load circuit, so that the current flowing to the first and second switching elements will not lag in phase when the discharge lamp load is in a preheating state.

9. A power source device comprising:

an input distortion reducing circuit including a smoothing capacitor and first and second switching elements for receiving an AC input current, for chopping the AC input current by alternately turning the first and second switching elements ON and OFF at a high frequency, for reducing any distortion of the input current, and for generating a DC voltage across the smoothing capacitor;

a first inverter circuit coupled to the input distortion improving circuit for generating a rectangular wave high frequency voltage from the DC voltage;

a load circuit coupled to the first inverter circuit for receiving the rectangular wave high frequency voltage;

means connected to the first and second switching elements for commonly controlling the first and second switching elements for chopping the Ac input current and for controlling the first inverter circuit; and a current compensating circuit for flowing to the first and second switching elements a current substantially antiphase with respect to at least one of a first current from the input distortion reducing circuit and a second current from the first inverter circuit wherein the control means comprises means for supplying to the first and second switching elements, when the discharge lamp load is in preheating and dimming states, driving signals having respectively different ON widths and the same oscillation frequency as that in a lighted state and for driving alternately the first and second switching elements, when the discharge lamp load is in the lighted state, with signals of substantially identical ON width, and means for gradually varying the ON width of the driving signals when the discharge lamp load shifts from the preheating state to the lighted state.

* * * * *

UNITED STATES PATENT AND TRADEMARK OFFICE
CERTIFICATE OF CORRECTION

PATENT NO. : 5,541,829
DATED : July 30, 1996
INVENTOR(S) : Machara et al.

It is certified that error appears in the above-indentified patent and that said Letters Patent is hereby corrected as shown below: On title page, Item 75: Inventors; change "Minorua" to --Minoru--;

Column 18, Line 51, change "arc" to --a--;

Column 20, Line 25, change "Ac" to --AC--;

Line 30, change "Ac" to --AC--;

Line 38, change "imposing" to --improving--;

Line 39, change "voltagel" to --voltage--;

Line 48, change "for" to --from--;

Column 22, Line 8, change "Ac" to --AC--.

Signed and Sealed this

Thirty-first Day of December, 1996

Attest:

BRUCE LEHMAN

*Attesting Officer*  *Commissioner of Patents and Trademarks*